(12) United States Patent
Numata et al.

(10) Patent No.: US 11,538,491 B2
(45) Date of Patent: Dec. 27, 2022

(54) INTERACTION SYSTEM, NON-TRANSITORY COMPUTER READABLE STORAGE MEDIUM, AND METHOD FOR CONTROLLING INTERACTION SYSTEM

(71) Applicant: HITACHI, LTD., Tokyo (JP)

(72) Inventors: Takashi Numata, Tokyo (JP); Ryuji Mine, Tokyo (JP); Yasuhiro Asa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 159 days.

(21) Appl. No.: 17/030,515

(22) Filed: Sep. 24, 2020

(65) Prior Publication Data
US 2021/0125630 A1   Apr. 29, 2021

(30) Foreign Application Priority Data
Oct. 28, 2019 (JP) .............................. JP2019-195122

(51) Int. Cl.
*G10L 25/78* (2013.01)
*G06F 3/16* (2006.01)

(52) U.S. Cl.
CPC ................. *G10L 25/78* (2013.01); *G06F 3/16* (2013.01); *G10L 2025/783* (2013.01)

(58) Field of Classification Search
CPC ....... G10L 13/00; G10L 13/02; G10L 13/033; G10L 13/0335; G10L 13/08; G10L 25/03; G10L 25/09; G10L 25/63; G10L 25/78; G10L 25/90; G10L 25/93; G10L 2025/783; G10L 15/00; G10L 15/02; G10L 15/08; G10L 15/10; G10L 15/22; G06F 3/16; G06F 3/167
See application file for complete search history.

(56) References Cited

U.S. PATENT DOCUMENTS

| 9,299,338 B2 * | 3/2016 | Kato ........................ G10L 13/08 |
| 11,270,684 B2 * | 3/2022 | Gopala .................. G06T 13/205 |
| 2006/0069559 A1 | 3/2006 | Ariyoshi et al. |
| 2017/0083281 A1 * | 3/2017 | Shin ....................... G10L 13/033 |
| 2017/0110111 A1 * | 4/2017 | Matsubara ............ G10L 13/027 |

FOREIGN PATENT DOCUMENTS

JP          2006-113546 A       4/2006

* cited by examiner

*Primary Examiner* — Edgar X Guerra-Erazo
*Assistant Examiner* — Alexander Joongie Kim
(74) *Attorney, Agent, or Firm* — Mattingly & Malur, PC

(57) ABSTRACT

An interaction system that interacts with a user is disclosed. The interaction system includes: an input device that receives a speech signal of the user; a computing device that determines a speech content of the interaction system for a speech content acquired from the speech signal of the user such that a frequency distribution of speech feature values of the speech content of the interaction system approaches an ideal frequency distribution; and an output device that outputs the determined speech content of the interaction system.

11 Claims, 18 Drawing Sheets

| USER SPEECH CONTENT | INTERFACE VERBAL INFORMATION CANDIDATE | SPEECH FEATURE VALUE |
|---|---|---|
| I WANT TO SAVE ENERGY TO PROTECT NATURAL ENVIRONMENT. PLEASE RECOMMEND WHERE TO START. | HOW ABOUT RAISING COOLING TEMPERATURE TO 28 DEGREES? | 3.20 |
| | GOOD. HOW ABOUT RESETTING COOLING TEMPERATURE FIRST? | 4.89 |
| | THAT'S GOOD IDEA. HOW ABOUT ADJUSTING COOLING TEMPERATURE SETTING WITHIN ACCEPTABLE RANGE? | 8.62 |

VERBAL INFORMATION

SPEECH FEATURE INFORMATION

FIG. 4

SPEECH HISTORY INFORMATION

| SPEECH NUMBER | SPEECH TIMING | SPEECH FEATURE VALUE NAME | SPEECH FEATURE VALUE |
|---|---|---|---|
| 1 | 0.35 | SPEECH TIME | 7.51 |
| 2 | 15.23 | | 2.19 |
| ... | ... | | ... |
| 100 | 1080.77 | | 2.08 |

SPEECH HISTORY INFORMATION (USER)

| SPEECH NUMBER | SPEECH TIME | SPEECH FEATURE VALUE NAME | SPEECH FEATURE VALUE |
|---|---|---|---|
| 1 | 8.35 | SPEECH TIME | 6.03 |
| 2 | 18.23 | | 1.23 |
| ... | ... | | ... |
| 80 | 1083.77 | | 1.03 |

SPEECH HISTORY INFORMATION (INTERACTING INTERFACE)

*FIG. 5*

| | 321 | 322 | 323 | 324 | 325 | 326 | 327 |
|---|---|---|---|---|---|---|---|
| | SPEECH DISTRIBUTION NAME | SPEECH FEATURE VALUE LOWER LIMIT | SPEECH FEATURE VALUE UPPER LIMIT | USER FREQUENCY | USER RELATIVE FREQUENCY | DISTRIBUTION CONVERSION COEFFICIENT | INTERFACE IDEAL RELATIVE FREQUENCY |
| SPEECH TIME DISTRIBUTION | | 0.00 | 1.00 | 39 | 0.22 | 1.64 | 0.36 |
| | | 1.00 | 2.00 | 25 | 0.14 | 1.36 | 0.19 |
| | | 2.00 | 3.00 | 16 | 0.09 | 1.33 | 0.12 |
| | | 3.00 | 4.00 | 13 | 0.07 | 1.00 | 0.07 |
| | | ... | ... | ... | ... | ... | ... |
| | | 18.00 | 19.00 | 2 | 0.01 | 0.60 | 0.01 |
| | | 19.00 | 20.00 | 1 | 0.01 | 0.55 | 0.01 |
| | | 20.00 | — | 4 | 0.02 | 0.50 | 0.01 |

| 328 | 329 | 330 | 331 | 332 |
|---|---|---|---|---|
| INTERFACE FREQUENCY | INTERFACE RELATIVE FREQUENCY | INTERFACE RELATIVE FREQUENCY DISTANCE | INTERFACE IDEAL FREQUENCY VALUE LOWER LIMIT | INTERFACE IDEAL FREQUENCY VALUE UPPER LIMIT |
| 35 | 0.35 | 0.01 | | |
| 20 | 0.10 | -0.01 | | |
| 13 | 0.10 | -0.01 | | |
| 4 | 0.04 | 0.03 | 3.00 | 4.00 |
| ... | ... | ... | | |
| 1 | 0.01 | 0.00 | | |
| 1 | 0.01 | 0.00 | | |
| 0 | 0.00 | 0.01 | | |

SPEECH DISTRIBUTION INFORMATION

| USER SPEECH CONTENT (341) | INTERFACE VERBAL INFORMATION CANDIDATE (342) | SPEECH FEATURE VALUE (343) |
|---|---|---|
| I WANT TO SAVE ENERGY TO PROTECT NATURAL ENVIRONMENT. PLEASE RECOMMEND WHERE TO START. | HOW ABOUT RAISING COOLING TEMPERATURE TO 28 DEGREES? | 3.20 |
| | GOOD. HOW ABOUT RESETTING COOLING TEMPERATURE FIRST? | 4.89 |
| | THAT'S GOOD IDEA. HOW ABOUT ADJUSTING COOLING TEMPERATURE SETTING WITHIN ACCEPTABLE RANGE? | 8.62 |

VERBAL INFORMATION

FIG. 7

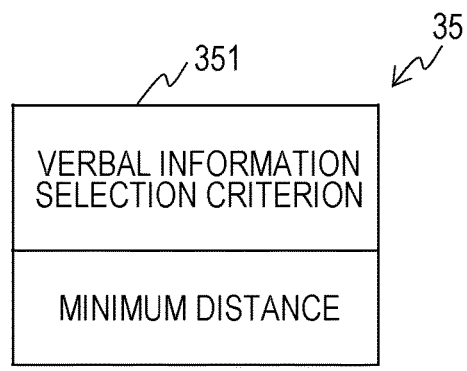

SPEECH SETTING INFORMATION

FIG. 8

| INTERFACE VERBAL INFORMATION CANDIDATE 361 | SPEECH FEATURE VALUE DISTANCE 362 | OUTPUT SIGNAL NAME 363 | INTERFACE SPEECH CONTENT 364 | SPEECH FEATURE VALUE 365 |
|---|---|---|---|---|
| HOW ABOUT RAISING COOLING TEMPERATURE TO 28 DEGREES? | 0.30 | VOICE | HOW ABOUT RAISING COOLING TEMPERATURE TO 28 DEGREES? | 3.20 |
| GOOD. HOW ABOUT RESETTING COOLING TEMPERATURE FIRST? | 1.39 | | | |
| THAT'S GOOD IDEA. HOW ABOUT ADJUSTING COOLING TEMPERATURE SETTING WITHIN ACCEPTABLE RANGE? | 5.12 | | | |

OUTPUT SPEECH INFORMATION 36

INTERACTION SYSTEM, NON-TRANSITORY COMPUTER READABLE STORAGE MEDIUM, AND METHOD FOR CONTROLLING INTERACTION SYSTEM

CLAIM OF PRIORITY

The present application claims priority from Japanese patent application JP 2019-195122 filed on Oct. 28, 2019, the content of which is hereby incorporated by reference into this application.

BACKGROUND OF THE INVENTION

1. Field of the Invention

The present disclosure relates to an interaction system, a non-transitory computer readable storage medium, and a method for controlling an interaction system that realize an interaction with a user via an interaction interface.

2. Description of the Related Art

JP 2006-113546 A discloses "an information transmission device, which makes a response in accordance with a diction of a speaker, including: a microphone M that detects a sound signal; a feature extraction unit 10 that extracts a feature value of the diction of the speaker based on the sound signal detected by the microphone M; a voice signal generation unit 30 that generates a voice signal to be uttered so that the voice signal has the same feature value based on the feature value extracted by the feature extraction unit 10; and a voice output unit 40 that performs an utterance based on the voice signal generated by the voice signal generation unit 30".

SUMMARY OF THE INVENTION

The information transmission device described in JP 2006-113546 A can evoke user's sympathy using the interaction interface and realize a sustainable interaction by outputting a voice of an interaction interface so as to imitate the speech feature value extracted from speech data acquired from the speaker. However, according to experiments conducted by the inventors, it has been found that there is a case where it is difficult to achieve both sympathetic evocation and action induction of the user even if the interaction interface imitates the user's speech feature value when one encourages the other to induce some action by supporting an intellectual task in which the counterpart person is engaged or urging the counterpart to take some action during an interaction.

FIGS. 17A and 17B respectively illustrate, as examples of the action induction, a graph of a frequency distribution of speech times of an answerer who is performing a Fermi estimate, which is one of intellectual tasks, and a graph of a frequency distribution of speech times of an adviser who advises the estimation. FIG. 17C is a graph illustrating an overlap of the frequency distribution of the speech times of the answerer and the frequency distribution of the speech times of the adviser. The horizontal axis of each graph represents the speech time of the answerer or the adviser. The vertical axis represents an appearance frequency of the speech time, and is adjusted with the total sum being one. The frequency distribution illustrates a distribution of frequencies or relative frequencies, and the examples of FIGS. 17A and 17B illustrate the distributions of the relative frequencies. With FIGS. 17A to 17C, it has been confirmed that the frequency distribution of the speech times of the adviser is biased to the shorter speech time than the frequency distribution of the speech times of the answerer.

Since no statistically significant difference was found in the total speech times of the answerer and the adviser in the speech time data used at the time of calculating these frequency distributions, it has been confirmed that it is easier to evaluate a difference between speech features of the answerer and the adviser when using the frequency distribution than the total speech time.

FIG. 18 is a graph illustrating a comparison result obtained by distinguishing short-term (less than two seconds) speeches of an answerer who is performing a Fermi estimate, which is one of intellectual tasks, and an adviser who advises the estimate between a good interaction and a bad interaction based on a confidence level of the answerer after answering. The horizontal axis of the graph represents the answerer and the adviser. The vertical axis represents the number of short-term speeches. With FIG. 18, it has been confirmed that the short-term speeches of the adviser were significantly more than that of the answerer in the good interaction statistically.

It has been obtained a result that it is desirable to output the speech of the interaction interface so as to urge the action induction of the user by outputting a lot of short-term speeches and efficiently presenting supportive or opposite opinions rather than simply imitating the user's speech feature value so as to evoke the sympathy in order to effectively achieve both the sympathetic evocation and the action induction of the user.

On the other hand, when the interaction interface outputs a speech so as to induce the user's action, the efficiency of the action induction of the user is likely to decrease if a speech time is prioritized over a speech content as there is more or less information to respond to the user's speech, for example.

Furthermore, the volume of the user's speech, a voice pitch, a rhythm, and a time are not constant, but vary every speech. Therefore, the user is likely to recognize that his/her speech feature value is being imitated if the speech of the interaction interface is output so as to imitate the user's speech feature value every time. If the user recognizes being imitated, it becomes difficult to evoke the sympathy, and thus, it is not always desirable for the interaction interface to output the speech so as to imitate the speech feature value every speech.

In order to solve the above-described problems, one of typical interaction systems of the invention is an interaction system which performs an interaction with a user, and includes: an input device that receives a speech signal of the user; a computing device that determines a speech content of the interaction system for a speech content acquired from the speech signal of the user such that a frequency distribution of speech feature values of the speech content of the interaction system approaches an ideal frequency distribution; and an output device that outputs the determined speech content of the interaction system.

According to a typical example of the invention, it is possible to evoke the sympathy of the user, realize the continuous interaction, and efficiently induce the action of the user.

Other objects, configurations, and effects which have not been described above become apparent from embodiments to be described hereinafter.

BRIEF DESCRIPTION OF THE DRAWINGS

FIG. 4 is a diagram illustrating speech history information according to the first embodiment;

FIG. 5 is a diagram illustrating speech distribution information according to the first embodiment;

FIG. 6 is a diagram illustrating verbal information according to the first embodiment;

FIG. 7 is a diagram illustrating speech setting information according to the first embodiment;

FIG. 8 is a diagram illustrating output speech information according to the first embodiment;

DESCRIPTION OF THE PREFERRED EMBODIMENTS

Figure 1A:
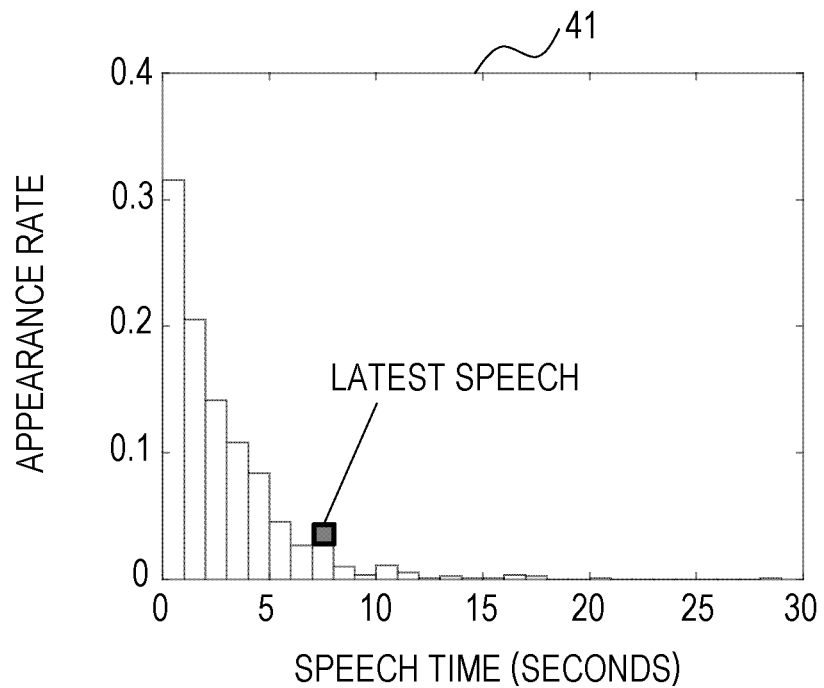
FIG. 1A is a diagram illustrating an example of an outline of an operation of an interaction system according to a first embodiment.
Figure 1B:
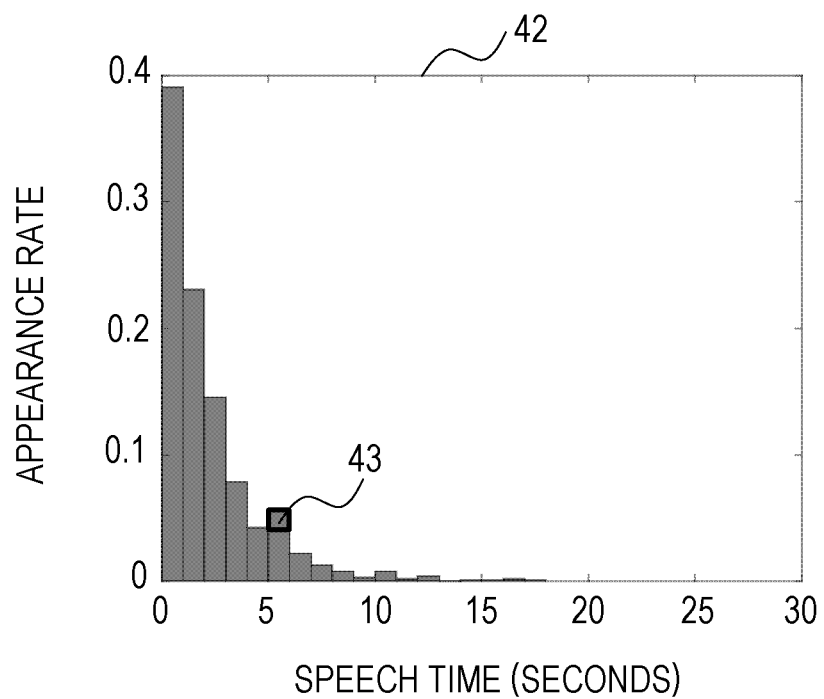
FIG. 1B is a diagram illustrating an example of the outline of the operation of the interaction system according to the first embodiment.
Figure 1C:
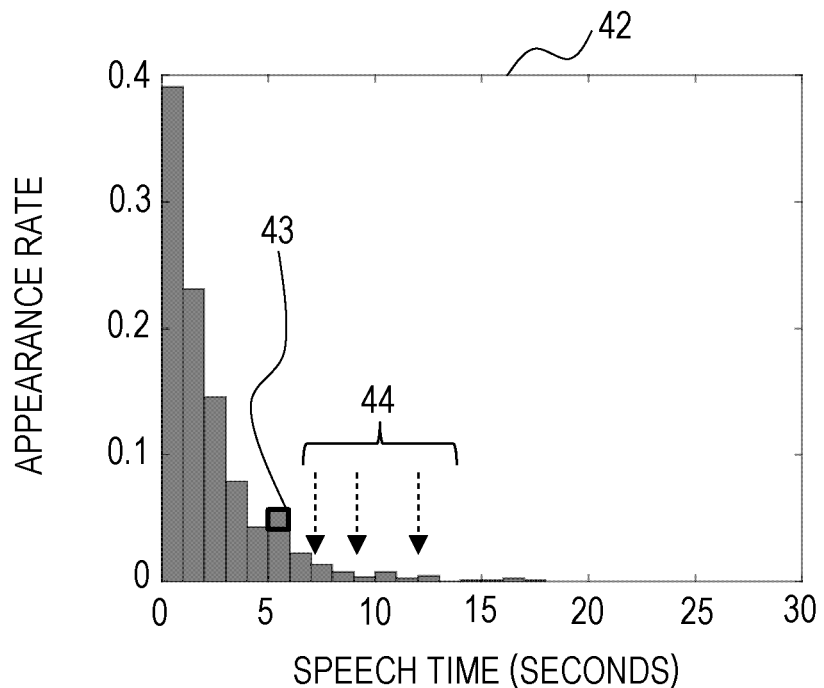
FIG. 1C is a diagram illustrating an example of the outline of the operation of the interaction system according to the first embodiment.
Figure 1D:
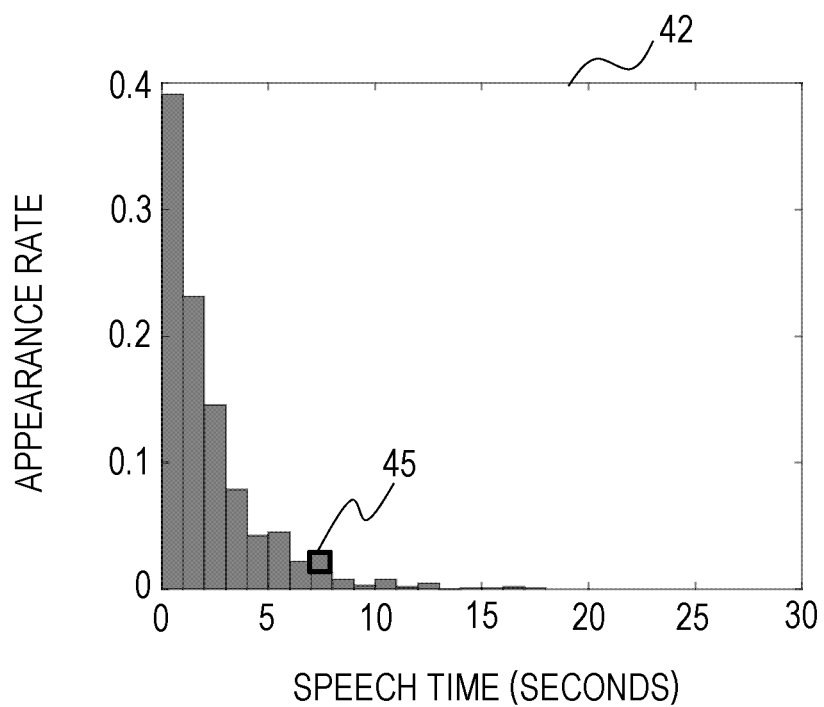
FIG. 1D is a diagram illustrating an example of the outline of the operation of the interaction system according to the first embodiment.

Hereinafter, embodiments will be described with reference to the drawings. In the configurations of the invention to be described hereinafter, the same or similar configurations or functions will be denoted by the same reference signs, and redundant descriptions will be omitted.

First Embodiment

FIGS. 1A to 1D are diagrams illustrating an example of an outline of an operation of an interaction system. The interaction system first acquires a speech signal of a user a plurality of times, and calculates a plurality of speech feature values, for example, speech times, to calculate a speech feature value distribution 41. Next, the interaction system calculates an ideal speech feature value distribution 42 (ideal frequency distribution) of an interaction interface and an ideal speech feature value 43 for approaching the distribution using the speech feature value distribution 41 of the user based on speech setting information of the interaction interface set in advance. The interaction interface is an interface configured to allow the device to interact with the user, and is realized by a combination of hardware and software, for example, a smart speaker, a chatbot, a communication robot, a voice assistant, and the like.

Further, the interaction system calculates verbal information from the speech signal of the user, and calculates verbal information candidates of the interaction interface and speech times 44 thereof using the verbal information of the user. Finally, the interaction system determines verbal information to be output and a speech time 45 thereof using the ideal speech time 43 for approaching the ideal speech feature value distribution 42 of the interaction interface, the verbal information candidates, and the speech times 44 thereof, and outputs a speech from the interaction interface. The speech time is a speech feature value suitable for realizing an interaction that achieves both sympathetic evocation and action induction by the user.

Figure 2A:
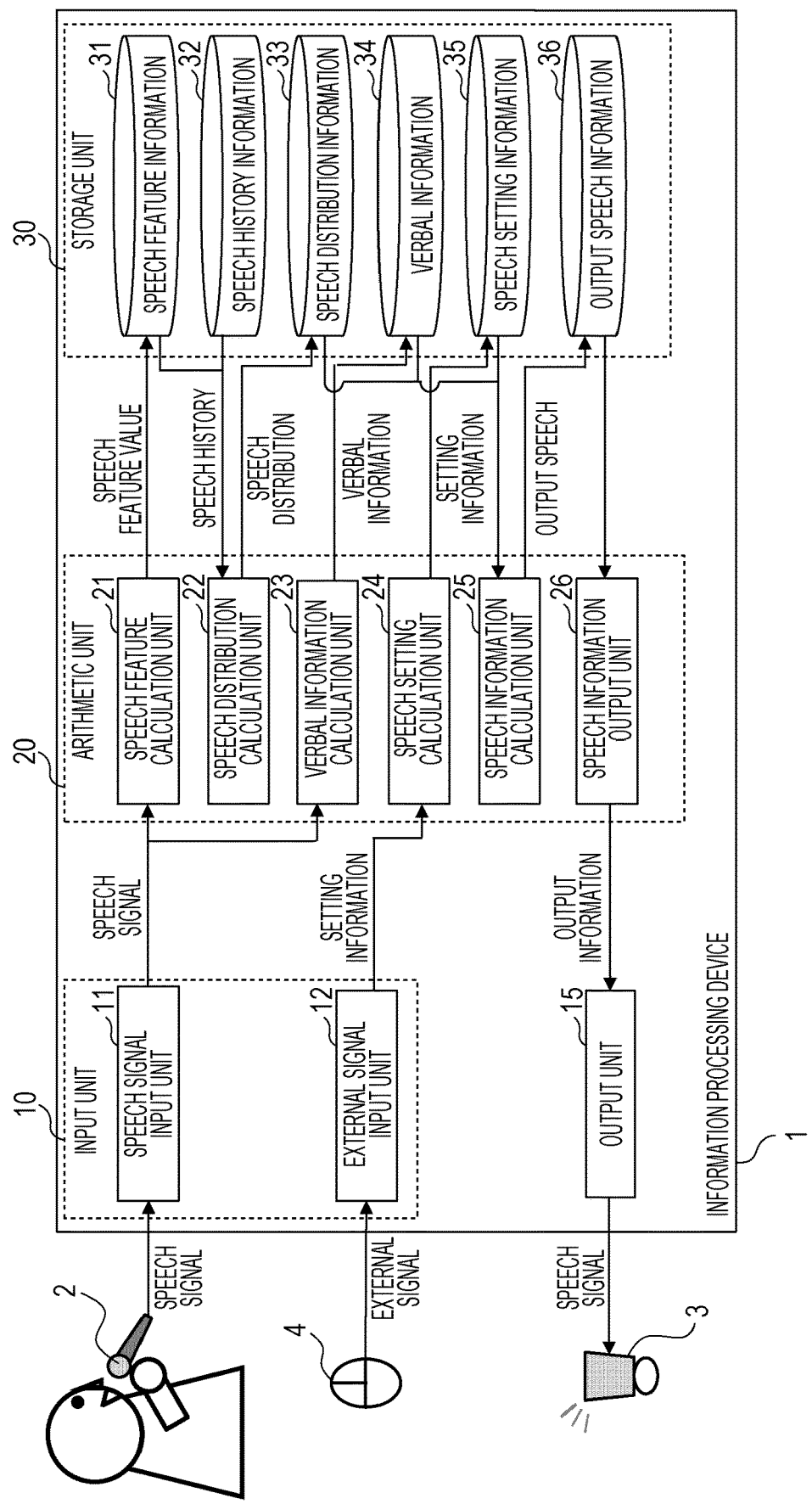
FIG. 2A is a diagram illustrating a configuration example of the interaction system according to the first embodiment.

FIG. 2A illustrates a configuration example of the interaction system. The interaction system includes an information processing device 1, a speech input device 2, an output device 3, and an external input device 4. FIG. 2A illustrates a logical configuration of the information processing device 1. The information processing device 1 includes an input unit 10, an output unit 15, an arithmetic unit 20, and a storage unit 30. The information processing device 1 measures a speech signal by the speech input device 2 and outputs speech information to a user from the output device 3 using an interaction interface. Not only the speech input device 2 and the output device 3 but also the external input device 4, such as a mouse, a keyboard, and a touch panel, is connected to the information processing device 1.

The input unit 10 is a unit that acquires a speech signal, an external signal, and the like and performs conversion for processing in the information processing device 1. A speech signal input unit 11 acquires a speech signal from the speech input device 2, and an external signal input unit 12 acquires an external signal from the external input device 4. The output unit 15 is a unit that converts output information acquired from the arithmetic unit 20 and outputs a speech signal to the output device 3 such as another information processing device, a display, and a speaker.

The arithmetic unit 20 is a unit responsible for arithmetic functions in the information processing device 1, and includes a speech feature calculation unit 21, a speech distribution calculation unit 22, a verbal information calculation unit 23, a speech setting calculation unit 24, a speech information calculation unit 25, and a speech information output unit 26. The storage unit 30 is a unit that stores a computing result of the arithmetic unit.

Figure 2B:
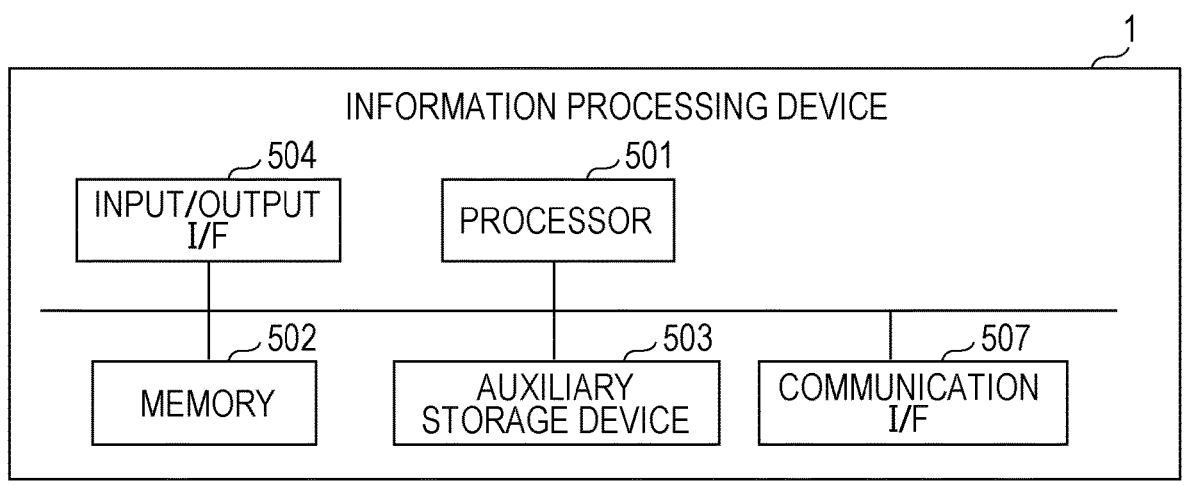
FIG. 2B is a diagram illustrating a configuration example of an information processing device according to the first embodiment.

FIG. 2B illustrates a hardware configuration example of the information processing device 1. The information processing device 1 can have a computer configuration. The information processing device 1 includes a processor 501, a memory (main storage device) 502, an auxiliary storage device 503, an input/output interface (I/F) 504, and a communication interface (I/F) 507. These components are connected to each other via a bus. The memory 502, the auxiliary storage device 503, or a combination thereof is a storage device, and stores programs and data to be used by the processor 501.

The memory 502 is configured using, for example, a semiconductor memory, and is mainly used to hold programs and data that are being executed. The processor 501 is an computing device and executes various processes according to the programs stored in the memory 502. Various functional units are realized as the processor 501 operates according to the programs. The auxiliary storage device 503 is configured using a large-capacity storage device such as a hard disk drive and a solid state drive, and is used to hold programs and data for a long time.

The processor 501 can be configured using a single processing unit or a plurality of processing units, and can include single os a plurality of processing units or a plurality of processing cores. The processor 501 can be implemented as one or a plurality of central processing units, a microprocessor, a microcomputer, a microcontroller, a digital signal processor, a state machine, a logic circuit, a graphic processor, a chip-on system and/or any device that manipulates a signal based on a control instruction.

The programs and data stored in the auxiliary storage device 503 are loaded into the memory 502 at the time of startup or when necessary, and various processes of the information processing device 1 are executed as the processor 501 executes the programs.

The input/output interface 504 is an interface (hardware device) for an input device and an output device, and can include a plurality of connection terminals. The processor 501 can communicate with the input device and the output device via the input/output interface 504.

Functions of the information processing device 1 can be implemented in a computer system including one or more computers including one or more processors and one or more storage devices including a non-transitory storage medium. The plurality of computers communicate via a network. For example, some of the plurality of functions of the information processing device 1 may be implemented on one computer and the other functions may be implemented on another computer.

Logical components of the information processing device 1 illustrated in FIG. 2A can be implemented by the hardware components illustrated in FIG. 2B. For example, the logical components are implemented by the input unit 10, the output unit 15, and the input/output interface 504. The input unit 10 includes a plurality of terminals (a universal serial bus (USB) and the like) for input of information from other devices, and the speech signal input unit 11 and the external signal input unit 12 include terminals for acquisition of signals, respectively. The output unit 15 includes VGA, HDMI (registered trademark), USB, and the like as terminals for connection with other devices.

The arithmetic unit 20 can be implemented by the processor 501. The processor 501 operates as the speech feature calculation unit 21, the speech distribution calculation unit 22, the verbal information calculation unit 23, the speech setting calculation unit 24, the speech information calculation unit 25, and the speech information output unit 26 according to the corresponding programs. The storage unit 50 can be implemented by the memory 502 and the auxiliary storage device 503.

As illustrated in FIG. 2A, first, the speech input device 2 acquires a speech signal. The acquired speech signal is input to the speech signal input unit 11. The speech feature calculation unit 21 calculates a speech feature value (for example, a speech time) based on the speech signal acquired from the speech signal input unit 11, and stores the calculated speech feature value in the storage unit 30 as speech feature information 31. Further, the speech distribution calculation unit 22 acquires the speech feature information 31 and speech history information 32 stored in the storage unit 30 together, and calculates a speech feature value distribution of a user. The speech distribution calculation unit 22 calculates an ideal speech feature value distribution of an interaction interface based on the speech feature value distribution of the user, and stores the calculated ideal speech feature value distribution in the storage unit 30 as speech distribution information 33.

In parallel, the verbal information calculation unit 23 acquires a speech signal from the speech signal input unit 11, calculates verbal information of the user based on the acquired speech signal, calculates verbal information candidates for the interaction interface and speech feature values thereof and stores the calculated verbal information candidates in the storage unit 30 as verbal information 34. The external input device 4 acquires an external signal, and the acquired external signal is input to the external signal input unit 12 to generate setting information. The speech setting calculation unit 24 calculates setting information to determine a speech of the interaction interface based on the setting information acquired from the external signal input unit 12, and stores the calculated setting information in the storage unit 30 as speech setting information 35.

The speech information calculation unit 25 acquires the speech distribution information 33, the verbal information 34, and the speech setting information 35, determines a speech to be output by the interaction interface, and stores the determined speech in the storage unit 30 as output speech information 36. Finally, the speech information output unit 26 acquires the speech output by the interaction interface from the output speech information 36, and uses the output device 3 to output a whole or part of the output speech information from the interaction interface.

When there are a plurality of the output devices 3, the speech information output unit 26 selects and outputs the output device 3 that matches an output signal name of the output speech information 36 based on, for example, information input by an expert in advance. The speech information output unit 26 may output not only the above information but also a whole or part of information created in each functional unit of the arithmetic unit 20 to the output unit 15.

The speech signal is a signal acquired from a user that can be used to calculate a speech feature value. Examples thereof include a human voice and the like, but are not limited to the voice. The speech signal includes various measurement signals at the time of speaking, such as an image of motion of a body such as a mouth or the surrounding environment, and an acceleration measured by an acceleration sensor attached to the user's throat, and is used at the time of acquiring information related to a speech of the user.

The speech feature value includes various feature values, such as a speech time calculated from the speech signal, a speaker switching pause (latency in an interaction), a speech energy (voice volume), a speech pitch or tone (voice pitch), and is used to output a speech of the interaction interface. In the present embodiment, a case where the speech time of the user is calculated as an example of the speech feature value will be described. Since these feature values are used, it is possible to facilitate an interaction that achieves both sympathetic evocation and action induction of the user.

The speech input device 2 is a device configured to acquire a speech signal from a user. Examples thereof include a microphone that acquires a human voice, a camera that captures a motion of a mouth, an acceleration sensor that is attached to a throat of a speaker, and the like. The output device 3 is a device configured to output a speech from an interaction interface. Examples thereof include a display that displays a speaking face and a speaker that outputs a voice.

The external input device 4 is a device configured to input an external signal, and is an input device configured to control the information processing device 1 such as a mouse and a keyboard. The external signal is a signal required to control the operation of the information processing device 1, and excludes a signal used to calculate a speech feature value or verbal information. Note that the respective functional units of the information processing device 1 may operate in separate devices. In addition, devices other than the devices illustrated in FIG. 2A may be incorporated in the information processing device 1.

Figure 3:
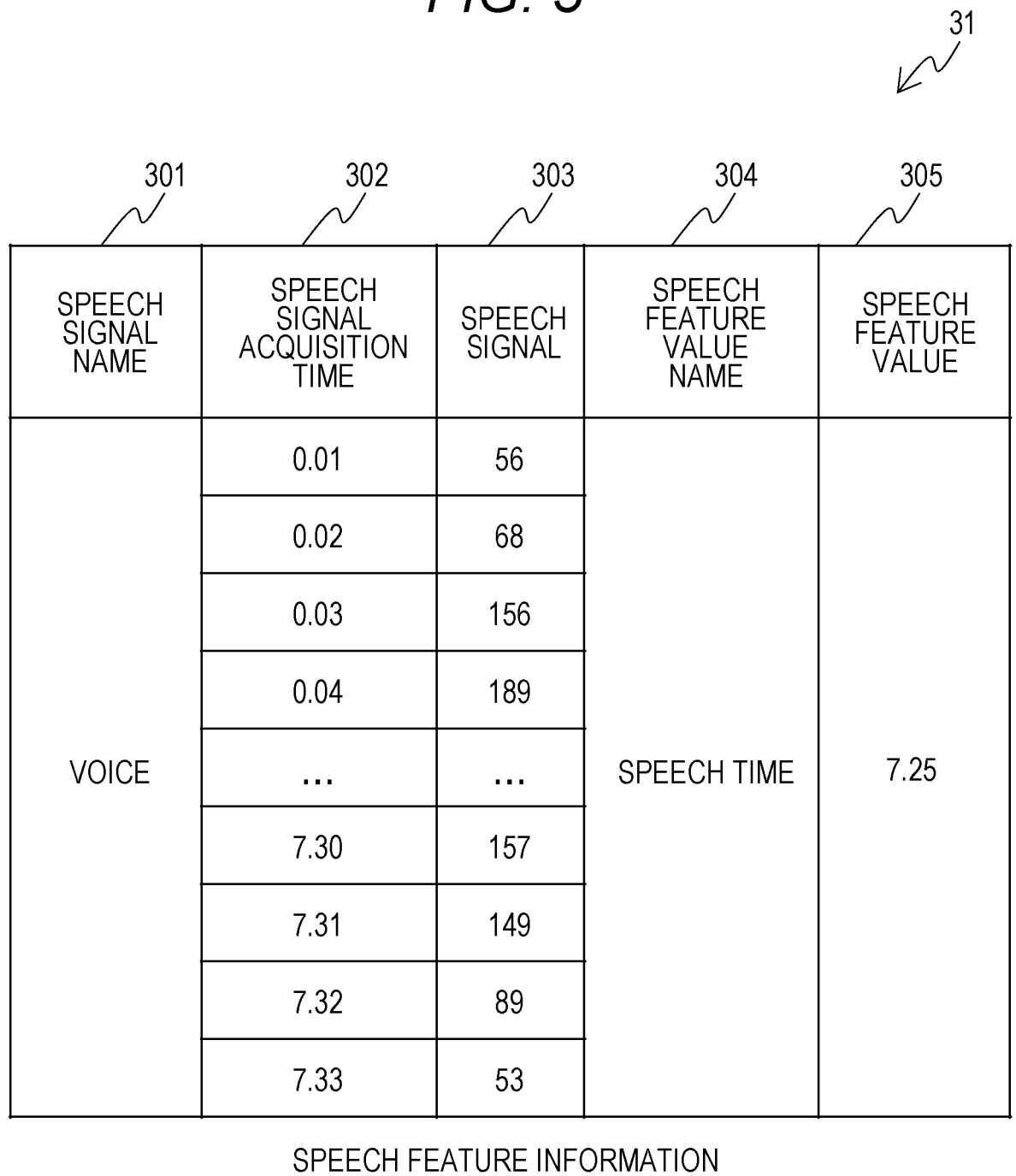
FIG. 3 is a diagram illustrating speech feature information according to the first embodiment.

FIG. 3 is an example of the speech feature information 31. The speech feature information 31 includes a speech signal name 301, speech signal acquisition time 302, a speech signal 303, a speech feature value name 304, and a speech feature value 305. Details of the respective items of the speech feature information 31 are as follows. If there is no particular description, the speech feature calculation unit 21 inputs the speech feature information 31.

The speech signal name 301 indicates a name of a speech signal and is, for example, a voice. The speech signal name is set in advance, and a previous signal name is input, for example. When the input unit 10 has a plurality of the speech signal input units 11, numbers may be assigned, such as "speech signal input unit 1" and "speech signal input unit 2", signal names corresponding to the input speech signal input unit 11 or the input unit may be set in advance, and any of these signal names may be input.

The speech signal acquisition time 302 indicates the timing when a speech signal has been acquired. The timing is, for example, an elapsed time from the measurement start timing of the speech signal. The speech signal 303 indicates a numerical value obtained by A/D (analog/digital) conversion of a speech signal input from the speech input device 2.

The speech feature value name 304 indicates a name of a speech feature value, and is, for example, a speech time. The speech feature value name is not limited to the speech time, and may be, for example, a speaker switching pause (latency in an interaction), a speech energy (voice volume), a speech pitch or tone (voice pitch), or the like.

The speech feature value 305 represents data for calculation of a speech feature value distribution from a speech signal, and is a time for which a user has spoken if the speech feature value name is the speech time. The speech time may be, for example, a time for which it is determined that a speech has been performed continuously by determining that that is a speech in a case where the sum of squares of a speech signal per predetermined time exceeds a preset threshold. For example, the speech time may be a time for which it is determined that a speech has been performed continuously by determining that there is a speech in a case where the number of times when the speech signal per predetermined time has crossed zero (changed from a positive value to a negative value or changed from a negative value to a positive value) exceeds a preset threshold.

When the speech feature value name is the speaker switching pause, the speech feature calculation unit 21 may calculate, as a feature value, for example, a time between the end of a speech of an interaction interface and the start of a speech of a user. If the speech feature value name is the speech energy, the speech feature calculation unit 21 may calculate, as a feature value, for example, the sum of squares of speech signals for a certain period of time. If the speech feature value name is the speech pitch or tone, the speech feature calculation unit 21 may calculate, as a feature value, a basic frequency, for example, by frequency analysis of speech signals for a certain period of time.

If there are a plurality of types of items in the speech information, such as a speech signal name and a speech signal, the items are expressed to be distinguishable by assigning numbers, for example, "speech signal name 1", "speech signal 1", and the like to describe the items similarly to the speech signal input unit.

FIG. 4 is an example of the speech history information 32. The speech history information 32 is generated and updated by the speech feature calculation unit 21. The speech history information 32 includes speech history information 32A of the user and speech history information 32B of the interaction interface. Each of the speech history information 32A and 32B includes a speech number 311, a speech timing 312, a speech feature value name 313, and a speech feature value 314. The speech history information 32A is created from the speech feature information 31 of one or a plurality of speeches, or the speech feature information 31 of a new speech is added to the speech history information 32A at any time. The speech history information 32B is created from the output speech information 36 of one or a plurality of speeches, or the output speech information 36 of a new speech is added to the speech history information 32B at any time. Details of the respective items of the speech history information 32 are as follows.

The speech number 311 indicates a speech number and is, for example, the same number as the number of times a speech feature value is calculated. The speech timing 312 indicates the timing when a speech used to calculate the speech feature value has been acquired. The speech timing may be speech start timing or speech end timing. Further, if the measurement start timing of the speech signal is common in the speech history information 32 (the same timing is set as the start point), the speech timing may be the timing when a speech signal used for calculation of the speech feature value has been acquired.

In the speech history information 32A of the user, each of the speech feature value name 313 and the speech feature value 314 includes the same information as information input in the past to each of the speech feature value name 304 and the speech feature value 305 of the speech feature information 31. In the speech history information 32B of the interaction interface, each of the speech feature value name 313 and the speech feature value 314 includes the same information as information input in the past to each of a speech feature value name and a speech feature value of the output speech information 36.

Note that the information included in the speech history information 32 may include all past speech feature values, or may be limited to a specific speech feature value based on a speech number or speech timing using information input in advance by an expert. For example, the speech feature calculation unit 21 may confirm whether a speech number upper limit, which has been input by the expert in advance, is exceeded every time the latest speech feature value is added, and delete speech timing and a speech feature value of an old speech number and reassign speech numbers if the upper limit is exceeded.

If there are a plurality of types of items, such as a speech feature value name and a speech feature value, the items are expressed to be distinguishable by assigning numbers, for example, "speech feature value name 1", "speech feature value 1", and the like to describe the items similarly to the speech feature information 31.

In the present embodiment, the latest speech feature information 31 is not included in the speech history information 32, but the latest speech feature information 31 is added to the speech history information 32 after the speech distribution calculation unit 22 reads the speech feature information 31 and the speech history information 32 creates the speech distribution information 33. On the contrary, for example, when the latest speech feature information 31 is added to the speech history information 32 immediately after being calculated, only the speech history information 32 may be used.

FIG. 5 is an example of the speech distribution information 33. The speech distribution information 33 includes a speech distribution name 321, a speech feature value lower limit 322, a speech feature value upper limit 323, a user frequency 324, a user relative frequency 325, a distribution conversion coefficient 326, an interface ideal relative frequency 327, an interface frequency 328, an interface relative frequency 329, an interface relative frequency distance 330, an interface ideal feature value lower limit 331, and an interface ideal feature value upper limit 332. If there is no particular description, it is assumed that the speech distribution calculation unit 22 inputs the speech distribution information 33. Details of the respective items of the speech distribution information 33 are as follows.

The speech distribution name 321 indicates a name of a speech distribution, and is, for example, a speech time distribution. The speech distribution calculation unit 22 acquires a speech feature value name of the speech feature information 31 or the speech history information 32, and inputs a speech distribution name such that the name represents the distribution of the speech feature value name.

The speech feature value lower limit 322 indicates a lower limit of a speech feature value to be counted at the time of calculating the frequency. The speech distribution calculation unit 22 sets a range of the speech feature values to be counted at the time of calculating the frequency together with the speech feature value upper limit 323, and inputs the number of speech feature values falling within the range to the user frequency 324. Values of the speech feature value lower limit 322 are not necessarily equidistant, for example, in a distribution in which speech feature values are concentrated in a specific range.

The speech feature value upper limit 323 indicates an upper limit of a speech feature value to be counted at the time of calculating the frequency. The speech feature value upper limit 323 is used at the time of inputting the user frequency, together with the speech feature value lower limit 322. Values of the speech feature value upper limit 323 are not necessarily equidistant, for example, in a distribution in which speech feature values are concentrated in a specific range, either.

The user frequency 324 indicates the number of speech feature values falling within the range of the speech feature value lower limit 322 and the speech feature value upper limit 323 among speech feature values of the speech feature information 31 and speech feature values of the speech history information 32A. The user relative frequency 325 indicates a ratio of a user frequency to the total sum of the user frequencies 324.

The distribution conversion coefficient 326 indicates a coefficient configured to calculate the interface ideal relative frequency 327 using the user relative frequency 325. The distribution conversion coefficient expresses the relationship between a user relative frequency and an interface ideal relative frequency by a linear equation, where x is the user relative frequency and y is the interface ideal relative frequency. The distribution conversion coefficient is a coefficient a in a case where the interface ideal relative frequency is calculated as $y=ax$.

There may be a plurality of types of the distribution conversion coefficients, such as a and b of $y=ax+b$. The relationship between the user relative frequency and the interface ideal relative frequency is not limited to the linear equation, and may be expressed by a polynomial such as $y=ax^2+bx+c$ or a multi-dimensional equation. The distribution conversion coefficient may be set for each speech feature value lower limit or speech feature value upper limit.

Figure 17A:
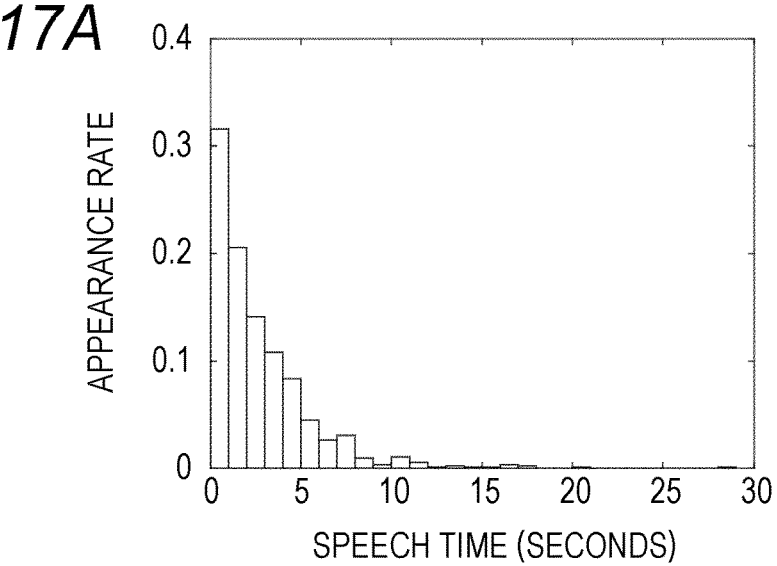
FIG. 17A is a diagram illustrating a graph illustrating a frequency distribution of speech times of an answerer during a Fermi estimate, which is one of intellectual tasks.
Figure 17B:
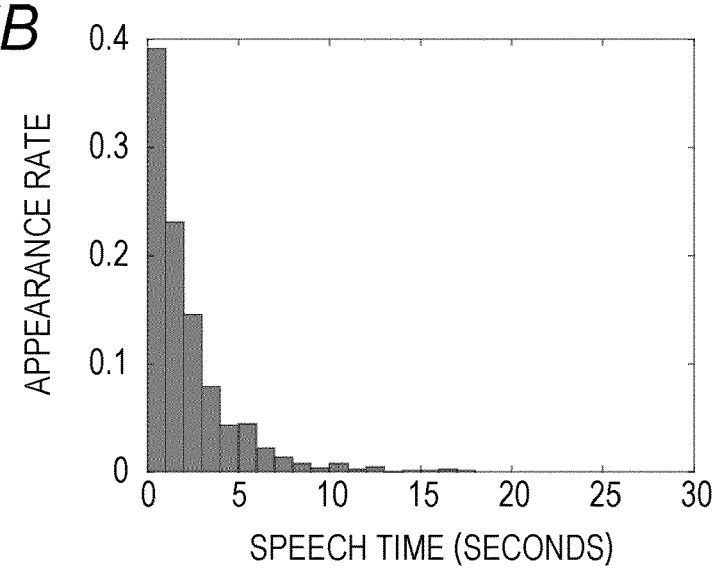
FIG. 17B is a diagram illustrating a graph illustrating a frequency distribution of speech times of an adviser during the Fermi estimate.
Figure 17C:
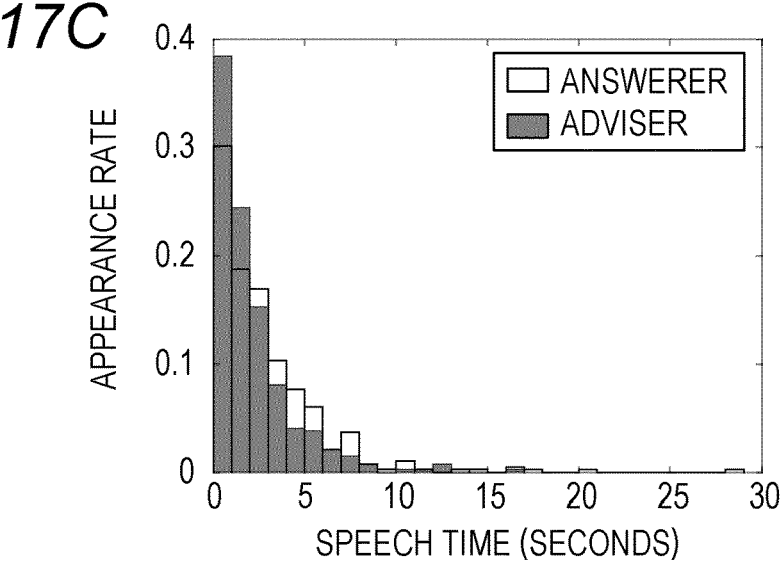
FIG. 17C is a diagram illustrating a graph illustrating an overlap of frequency distributions of speech times of the answerer and the adviser during the Fermi estimate.
Figure 18:
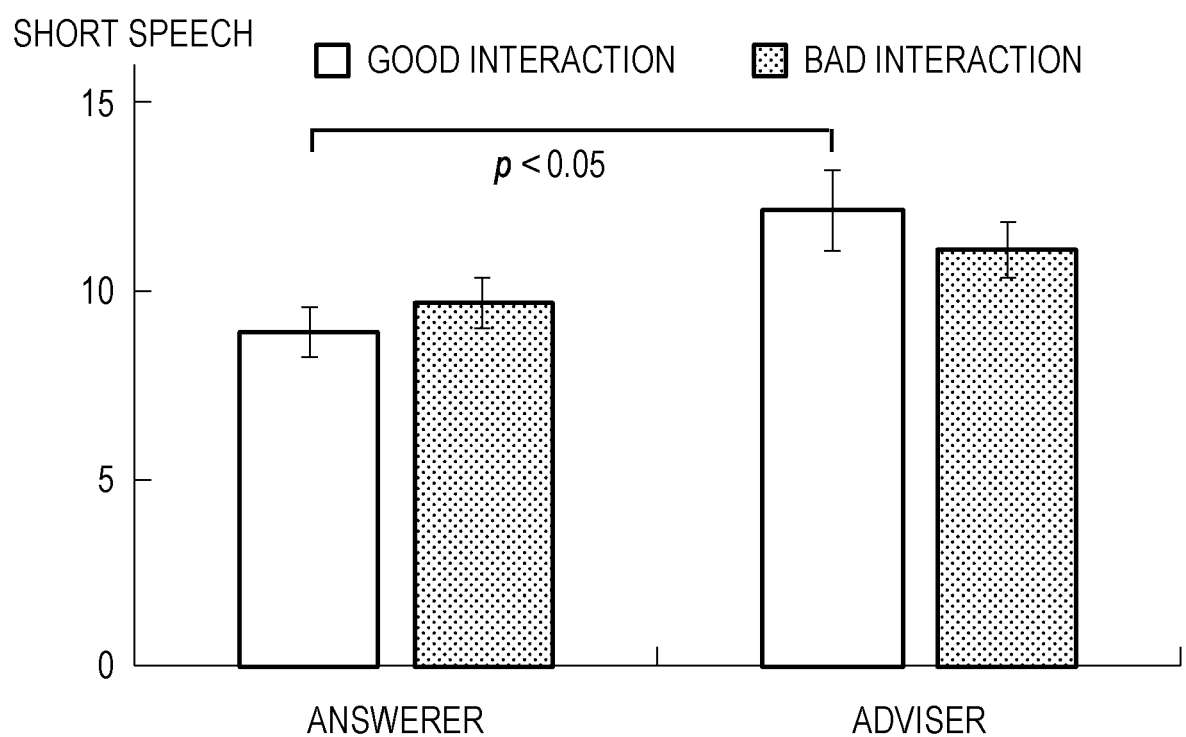
FIG. 18 is a diagram illustrating a graph in which short-term speech times of the answerer and the adviser during the Fermi estimate are distinguished and compared between a good interaction and a bad interaction.

A common distribution conversion coefficient may be set in advance according to a distribution conversion rule set in advance according to the determination of an expert or the like. For example, the speech distribution calculation unit 22 inputs a user relative frequency, which has been input to a speech feature value lower limit, larger than the speech feature value lower limit of the interface ideal relative frequency by the coefficient a, to an interface ideal relative frequency, and inputs zero to an interface ideal relative frequency to which no user relative frequency has been input (the interface ideal relative frequency at the speech feature value lower limit near the maximum). As described with reference to FIGS. 17A to 18, in the example of the speech time distribution, the interface ideal relative frequency is determined such that the number of speech times shorter than the speech time of the user increases. As a result, it becomes possible to perform the interaction that more effectively achieves both the sympathetic evocation and the action induction.

The interface ideal relative frequency 327 is a numerical value indicating the ideal speech feature value distribution of the interaction interface as a ratio for each value of the speech feature value lower limit 322 or each value of the speech feature value upper limit 323. A value of the interface ideal relative frequency 327 is calculated using a value of the user relative frequency 325 and a value of the distribution conversion coefficient 326.

The interface frequency 328 indicates the number of speech feature values that fall within the range of the speech feature value lower limit and the speech feature value upper limit among the speech feature values of the speech history information 32B. The interface relative frequency 329 indicates a ratio of the interface frequency to the total sum of the interface frequencies 328.

The interface relative frequency distance 330 represents a difference between the interface ideal relative frequency (ideal frequency distribution) and the interface relative frequency (frequency distribution). The interface relative frequency distance may be, for example, a gap between the interface ideal relative frequency and the interface relative frequency. The interface relative frequency distance may be a numerical value obtained by setting a distance coefficient a for each speech feature value lower limit or speech feature value upper limit and performing weighting by a method such as calculating the product of the gap between the interface ideal relative frequency and the interface relative frequency and the distance coefficient.

The interface ideal feature value lower limit 331 indicates an ideal speech feature value lower limit of a speech output next by the interaction interface, and is calculated using the interface relative frequency distance. A method of calculating the interface ideal feature value lower limit from the interface relative frequency distance may use information input by an expert in advance or may be the same method as a previous calculation method. A value of the interface ideal feature value lower limit 331 may be, for example, a value of the speech feature value lower limit 322 at which the interface relative frequency distance 330 has the largest value.

The interface ideal feature value upper limit 332 indicates an ideal speech feature value upper limit of a speech output next by the interaction interface, and is calculated using the interface relative frequency distance. A method of calculating the interface ideal feature value upper limit from the interface relative frequency distance may use information input by an expert in advance or may be the same method as a previous calculation method.

A value of the interface ideal feature value upper limit 332 may be, for example, a value of the speech feature value upper limit 323 at which the interface relative frequency distance 330 has the largest value. For example, if the speech distribution name 321 is the speech time distribution, the value of the interface ideal feature value lower limit 331 is 3.00, and the value of the interface ideal feature value upper limit 332 is 4.00, the ideal speech feature value of the speech output next by the interaction interface is a speech time between 3.00 seconds and 4.00 seconds.

Note that an interface ideal feature value may be set without setting the interface ideal feature value lower limit 331 and the interface ideal feature value upper limit 332, and a specific value may be input instead of the specific range. For example, a value of the speech feature value lower limit 322 having the largest value of the interface relative frequency distance 330 is input.

FIG. 6 is an example of the verbal information 34. The verbal information 34 includes a user speech content 341, an interface verbal information candidate 342, and a speech feature value 343. Details of the respective items of the verbal information 34 are as follows. If there is no particular description, it is assumed that the verbal information calculation unit 23 inputs the verbal information 34.

The user speech content 341 indicates a speech content recognized from the voice of the user using the speech signal of the speech feature information 31. If the speech signal of the speech feature information 31 is not the voice of the user, the verbal information calculation unit 23 may use another type of speech input device to acquire the voice of the user as another type of speech signal and calculate the speech content of the user.

The interface verbal information candidate 342 indicates a candidate of a speech output by the interaction interface with respect to the user speech content in order to induce the user's action. As the interface verbal information candidate, a related content such as a response and a question to the user speech content may be input in advance according to the determination of an expert. A speech content including the same or similar term or expression as the user speech content may be selected from a language database input in advance.

If the user's action that needs to be induced is constant, a speech content including a term or an expression that induces a specific action of the user may be selected as the interface verbal information candidate. The interface verbal information candidate may be selected from past user speech contents and interface verbal information candidates. Two or more pieces of interface verbal information having the same speech content are created.

FIG. 6 illustrates an example in which three interface verbal information candidates have been created. A rule may be set so as to create a candidate such that interface verbal information candidates with different speech feature values are created when the speech feature value is affected by the interface verbal information candidate. The interface verbal information candidates may be created randomly.

For example, an interface verbal information candidate may be calculated after setting conditions for each candidate such that the number of speech characters varies to some extent such as calculation of only candidates having three or more different speech characters since a speech time is affected by the number of speech characters. Further, the verbal information calculation unit 23 may acquire values of the interface ideal feature value lower limit 331 and the interface ideal feature value upper limit 332 of the speech distribution information 33 and calculate an interface verbal information candidate such that a speech feature value falls within or near such a range. When a speech feature value can be changed without changing an interface verbal information candidate, the same interface verbal information candidate may be used.

The speech feature value 343 indicates information similar to the speech feature value included in the speech feature information 31 or the speech history information 32, and this value is calculated for each interface verbal information candidate. When the speech feature value is affected by the interface verbal information candidate, the speech feature value may be calculated from the interface verbal information candidate. For example, when the speech feature value is the speech time and the interaction interface sets the number of characters that can be spoken per certain period of time, the speech feature value may be calculated from the interface verbal information candidate using this setting.

If the speech feature value is not affected by the interface verbal information candidate, a speech feature value may be calculated after setting conditions for each speech feature value such that speech feature value varies to some extent such as creation of only speech feature values whose speaker switching pause differ by 0.2 seconds or more, for example, or may be calculated randomly.

FIG. 7 is an example of the speech setting information 35. The speech setting information 35 includes a verbal information selection criterion 351. Details of the speech setting information 35 are as follows. If there is no particular description, it is assumed that the speech setting calculation unit 24 inputs the speech setting information 35.

The verbal information selection criterion 351 represents a criterion to determine a speech content of the interaction interface using the interface ideal feature value lower limit and the interface ideal feature value upper limit of the speech distribution information 33, and the interface verbal information candidate of the verbal information 34 and its speech feature value. As the verbal information selection criterion, for example, an external signal, input from a mouse or a keyboard according to the determination of an expert in advance and acquired from the external signal input unit 12, may be used, or previously input information may be used. The speech setting information 35 realizes the interaction according to the user setting.

In addition to the verbal information selection criterion 351, the speech setting information 35 may include another information, which is generated from an external signal input from a mouse or a keyboard in advance by an expert or the like and acquired from the external signal input unit 12, and the information included in the speech setting information 35 may be acquired by a functional unit other than the speech setting calculation unit 24.

For example, if a verbal information selection criterion is the minimum distance as in the example of FIG. 7, the speech information calculation unit 25 selects and inputs an interface verbal information candidate having the smallest speech feature value distance. The speech setting information 35 may include, for example, an item for inputting a criterion for selection of information to be input in the speech feature value name of the speech feature information 31. The speech setting information 35 may include, for example, an item for inputting an algorithm for calculation of the interface ideal feature value lower limit and the interface ideal feature value upper limit from the interface relative frequency distance of the speech distribution information 33.

FIG. 8 is an example of the output speech information 36. The output speech information 36 includes an interface verbal information candidate 361, a speech feature value distance 362, an output signal name 363, an interface speech content 364, and a speech feature value 365. If there is no particular description, it is assumed that the speech information calculation unit 25 inputs the output speech information 36.

The interface verbal information candidate 361 includes the same information as the interface verbal information candidate 342 of the verbal information 34. The speech feature value distance 362 indicates a numerical value representing a difference between an ideal speech feature value and a speech feature value of each interface verbal information candidate. The ideal speech feature value is calculated using, for example, a value of the interface ideal feature value lower limit 331 and a value of the interface ideal feature value upper limit 332 of the speech distribution information 33, and an interface verbal information candidate of the verbal information 34 and its speech feature value. The speech feature value distance is, for example, a difference between an average value of the interface ideal feature value lower limit and the interface ideal feature value upper limit, and the speech feature value of each interface verbal information candidate.

The output signal name 363 indicates information of a signal to output an interface speech content, and is a voice, for example. As the output signal name, for example, information input in advance according to the determination of an expert may be used, or an output signal name when the previous speech is output may be used. The interface speech content 364 is a speech content of the interaction interface determined using the speech feature value distance and the verbal information selection criterion of the speech setting information 35.

If speeches of the interaction interface having speech feature values that gives the ideal speech feature value distribution can be continuously output, the speech information calculation unit 25 may randomly select the interface speech content from the interface verbal information candidates with a certain probability. As a result, it is possible to prevent the user from recognizing that the speech feature value of the user is used to determine the speech feature value of the interaction interface. In this case, the speech setting information 35 may further include an item of an exceptional condition, and the speech information calculation unit 25 may select another criterion, for example, the interface speech content randomly, without using the verbal information selection criterion when the exceptional condition is satisfied.

Further, the speech setting information 35 may include an item of another criterion, such as whether to consider the immediately previous speech feature value, in addition to the verbal information selection criterion. For example, when there is a large change from a speech feature value of an interface speech content immediately before a speech feature value that provides the ideal speech feature value distribution (for example, when an immediately previous interface speech time is very long), the speech information calculation unit 25 may select an interface speech content based on a combination of weighted criteria of the speech setting information 35.

Figure 9:
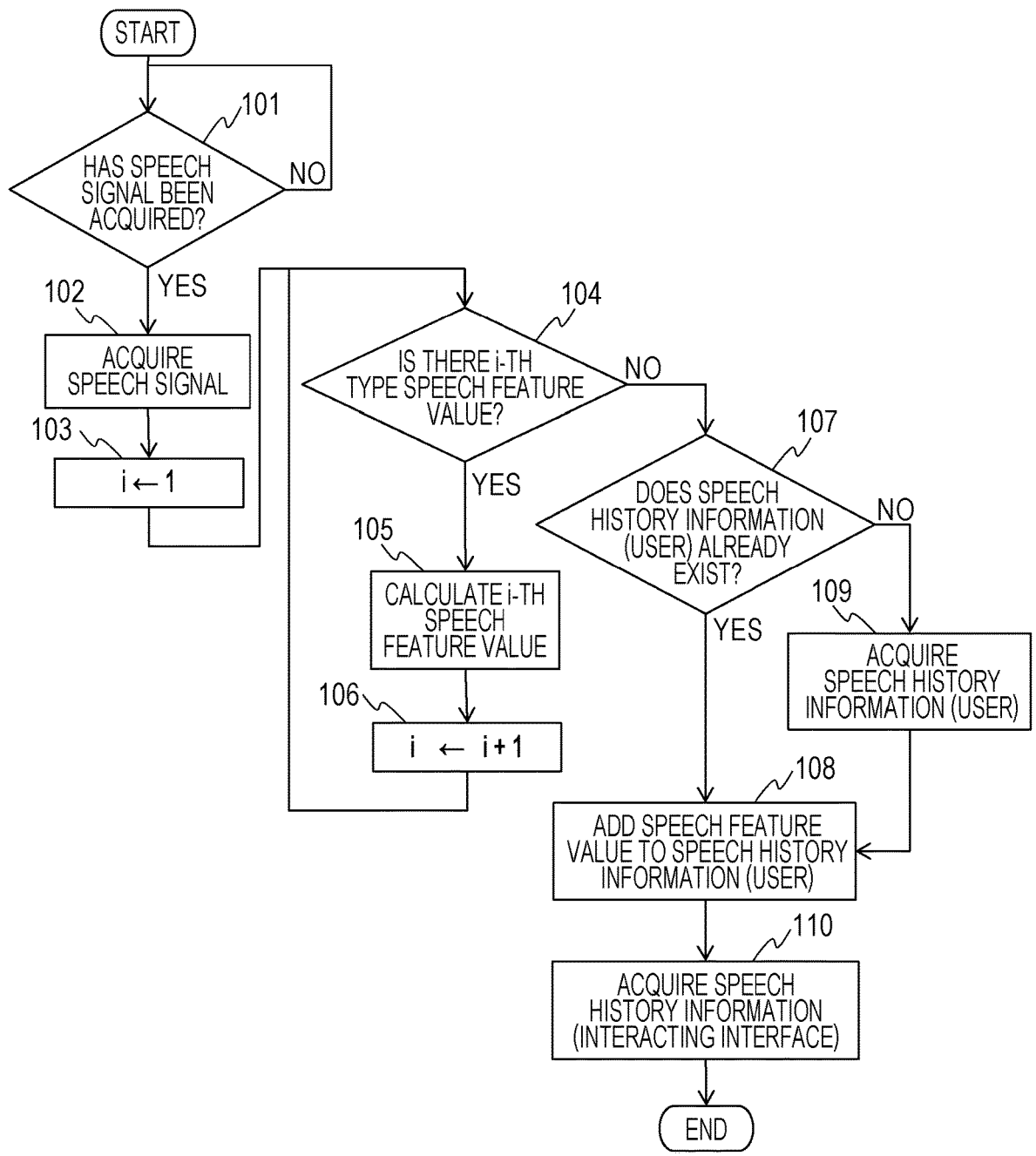
FIG. 9 is a diagram illustrating a flowchart illustrating an example of a processing procedure in a speech feature calculation unit according to the first embodiment.

Next, an operation of the arithmetic unit 20 of the information processing device 1 will be described. FIG. 9 is a flowchart illustrating an example of a processing procedure in the speech feature calculation unit 21.

Step 101: The speech feature calculation unit 21 determines whether the speech signal input unit 11 has acquired a speech signal. When the speech signal has been acquired (101: YES), the speech feature calculation unit 21 proceeds to Step 102. When the speech signal has not been acquired (101: NO), the speech feature calculation unit 21 repeats Step 101. The speech feature calculation unit 21 may perform Step 101 for another input unit, and may repeat Step 101 if a plurality of signal acquisition units selected by an expert or all the signal acquisition units have not acquired signals.

Step 102: The speech feature calculation unit 21 acquires the speech signal. A name stored in the speech signal name 301 of the speech feature information 31 and time stored in the speech signal acquisition time 302 are acquired together with the speech signal. Note that the speech signal name and the speech signal acquisition time may be acquired in another step such as Step 103. When there are a plurality of types of speech signals, a step of determining whether all speech signals have been acquired may be added after Step 102. For example, the speech feature calculation unit 21 proceeds to Step 103 if all the speech signals have been acquired, and the speech feature calculation unit 21 returns to Step 101 if any speech signal has not been acquired.

Step 103: The speech feature calculation unit 21 sets a counter i to one.

Step 104: The speech feature calculation unit 21 determines whether there is the i-th type speech feature value. If there is the i-th type speech feature value (104: YES), the speech feature calculation unit 21 proceeds to Step 105. If there is no i-th type speech feature value (104: NO), the speech feature calculation unit 21 proceeds to Step 107.

Step 105: The speech feature calculation unit 21 calculates the i-th speech feature value using the speech signal. The speech feature calculation unit 21 acquires a name to be stored in the speech feature value name 304 of the speech feature information 31 together with the speech feature value. Note that the speech feature value name may be acquired in another step such as Step 106.

Step 106: The speech feature calculation unit 21 increments the counter i by one.

Step 107: The speech feature calculation unit 21 determines whether the speech history information 32A already exists. If the speech history information 32A already exists (107: YES), the speech feature calculation unit 21 proceeds to Step 108. If the speech history information 32A does not exist (107: NO), the speech feature calculation unit 21 proceeds to Step 109.

Step 108: The speech feature calculation unit 21 adds the calculated speech feature value of the speech feature information 31 to the speech feature value 314 of the speech history information 32A. The speech feature calculation unit 21 not only adds the speech feature value but also adds the speech feature value name of the calculated speech feature information 31 to the speech feature value name 313 of the speech history information 32A. The speech feature calculation unit 21 adds the acquired information on the speech signal acquisition time to the speech timing 312 of the speech history information 32A. The addition of information other than the speech feature value may be executed in another step added between Step 108 and the end of this processing.

Step 109: The speech feature calculation unit 21 acquires the speech history information 32A. The speech history information 32A may be the user's own past speech data or may be acquired from speech history information of another user. The acquired data may be determined under a condition set in advance according to the determination of an expert. The speech history information 32A may be newly created using the speech feature value calculated in Step 105. When the speech history information 32A is newly created using the speech feature value calculated in Step 105, the speech feature calculation unit 21 may proceed to Step 110 without proceeding to Step 108.

Step 110: The speech feature calculation unit 21 acquires the speech history information 32B and ends the processing. The speech history information 32B may be acquired from a speech feature value included in the past speech history information or the latest output speech information 36, may be acquired from past speech data of the interaction interface with respect to the user, or may be acquired from speech history information using past speech data of the interaction interface with respect to another user.

The acquired data may be determined under a condition set in advance according to the determination of an expert. The speech history information 32B may be newly created and acquired using a speech feature value included in the latest output speech information. If there is no data that enables acquisition (including creation) of the speech history information 32B, the speech feature calculation unit 21 may end the processing without acquiring the speech history information 32B. If the processing is ended without acquiring the speech history information 32B, for example, the speech distribution calculation unit 22 may input zero to all the items of the interface frequency 328 and the interface relative frequency 329 of the speech distribution information 33 and calculate the interface ideal feature value lower limit 331 and the interface ideal feature value upper limit 332 using only the user relative frequency 325.

In this manner, the speech feature calculation unit 21 uses the speech signal acquired by the speech signal input unit 11 to calculate the speech feature information 31 including the speech feature value from the speech signal, and adds the calculated speech feature value to the speech history information 32 or newly creates the speech history information 32. As a result, it is possible to create data required for the speech feature value distributions of the user and the interaction interface.

In the case of the operation of the speech feature calculation unit 21 performed for the second time or later since the start of the interaction, the speech feature calculation unit 21 may update the speech feature information 31 and the speech history information 32 to the latest information using the previous speech feature information 31 and the speech history information 32.

When a plurality of speech signals are acquired using a plurality of measurement devices or measurement channels (measurement points) for a speech signal in the speech feature calculation unit 21, the speech feature calculation unit 21 uses the plurality of acquired speech signals by calculating an average value of the signals of the plurality of devices or channels. Further, the speech feature calculation unit 21 may calculate a speech feature value by using information other than the speech signal, such as allowing the user to verbally reply the speech time.

Figure 10:
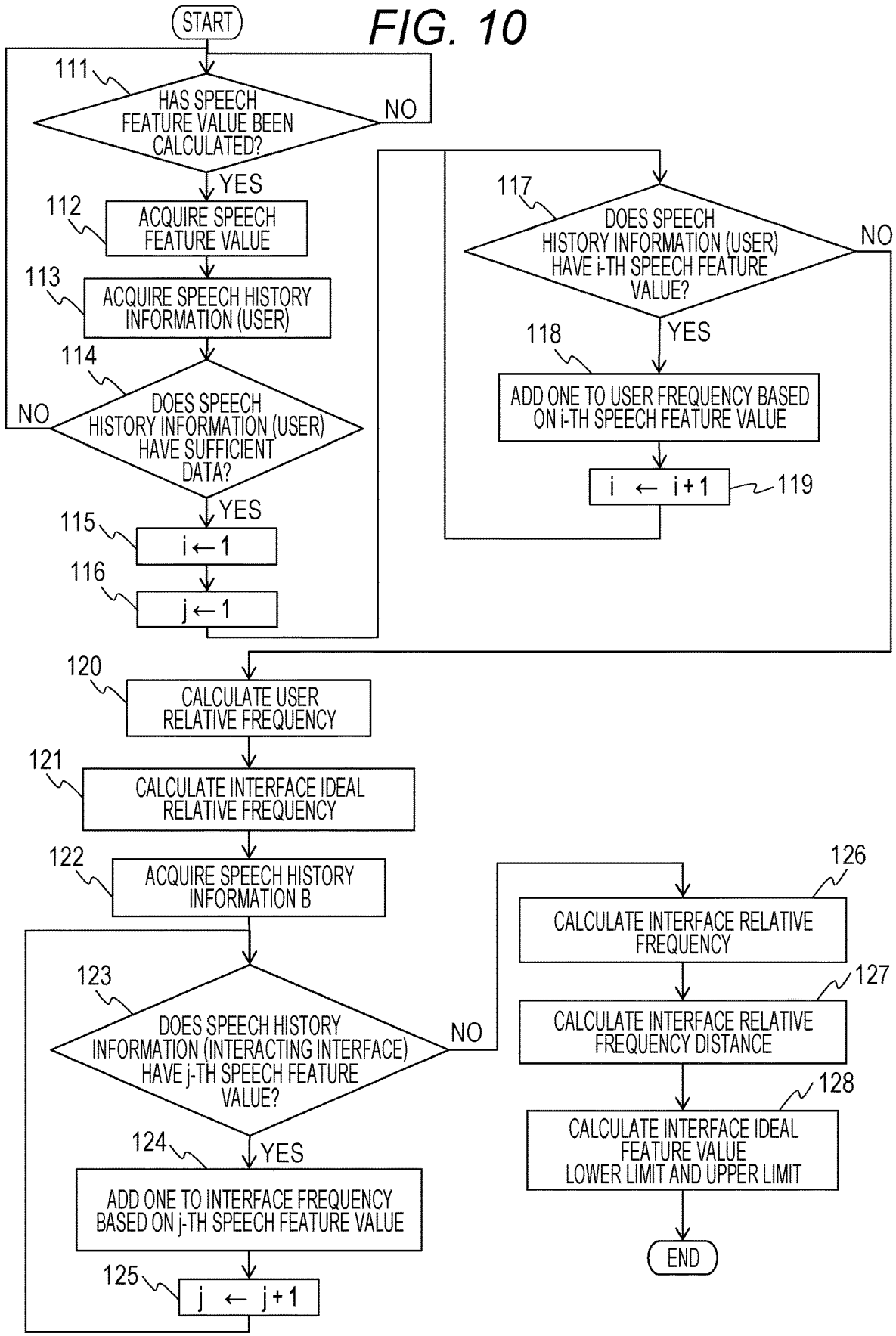
FIG. 10 is a diagram illustrating a flowchart illustrating an example of a processing procedure in an interaction distribution calculation unit according to the first embodiment.

FIG. 10 is a flowchart illustrating an example of a processing procedure in the speech distribution calculation unit 22. Step 111: The speech distribution calculation unit 22 determines whether the speech feature calculation unit 21 has calculated a speech feature value. The speech distribution calculation unit 22 proceeds to Step 112 if the speech feature value has been calculated (111: YES), and the speech distribution calculation unit 22 repeats Step 111 if the speech feature value has not been calculated (111: NO).

The speech distribution calculation unit 22 may perform Step 111 for the input unit 10 and other functional units. The speech distribution calculation unit 22 may determine in Step 111 whether the speech feature calculation unit 21 has calculated or acquired other information. The speech distribution calculation unit 22 may repeat Step 111 unless a plurality of pieces of information selected in advance by the expert or all the pieces of information have been acquired.

Step 112: The speech distribution calculation unit 22 acquires the speech feature value calculated by the speech feature calculation unit 21. When there are a plurality of types of speech feature values, a step of determining whether all the speech feature values have been acquired may be added after Step 112. The speech distribution calculation unit 22 can proceed to Step 113 if all the speech feature values have been acquired, and can return to Step 111 if any speech feature value has not been acquired.

Step 113: The speech distribution calculation unit 22 acquires the speech history information 32A. If the speech history information 32A already exists, Step 113 may be performed before Step 108 in which the speech feature calculation unit 21 adds the speech feature value to the speech history information 32A. In the case of acquiring the speech history information 32A after Step 108, the speech distribution calculation unit 22 may determine whether the speech feature value has been added to the speech history information 32A instead of calculating the speech feature value in Step 111, and proceed to Step 113 without acquiring the speech feature value in Step 112.

Step 114: The speech distribution calculation unit 22 determines whether the speech history information 32A has a sufficient data amount. The speech distribution calculation unit 22 proceeds to Step 115 if the data amount is sufficient (114: YES), and the speech distribution calculation unit 22 returns to Step 111 if the data amount is not sufficient (114: NO). Whether the speech history information 32A has the sufficient data amount may be determined based on a criterion input by an expert in advance. Alternatively, the speech setting information 35 may include an item for inputting a threshold serving as a determination criterion, and the determination may be performed based on the threshold.

Step 115: The speech distribution calculation unit 22 sets the counter i to one.

Step 116: The speech distribution calculation unit 22 sets the counter j to one.

Step 117: The speech distribution calculation unit 22 determines whether the speech history information 32A has the i-th speech feature value. The speech distribution calculation unit 22 proceeds to Step 118 if there is the i-th speech feature value (117: YES), and the speech distribution calculation unit 22 proceeds to Step 120 if there is no i-th speech feature value (117: NO).

Step 118: The speech distribution calculation unit 22 acquires the i-th speech feature value of the speech history information 32A, and increments a value of the user frequency 324 satisfying a value of the speech feature value lower limit 322 and a value of the speech feature value upper limit 323 of the speech distribution information 33 by one. Values of the speech distribution name 321, the speech feature value lower limit 322, and the speech feature value upper limit 323 of the speech distribution information 33 may be acquired before the user frequency is incremented at the time of proceeding to Step 118 for the first time, may be acquired in a step before Step 118, such as Step 117, or may be acquired in a step added before Step 118.

Step 119: The speech distribution calculation unit 22 increments the counter i by one.

Step 120: The speech distribution calculation unit 22 calculates a value of the user relative frequency 325 using a value of the user frequency 324 of the speech distribution information 33.

Step 121: The speech distribution calculation unit 22 determines the interface ideal relative frequency 327 based on the user relative frequency 325 of the speech distribution information 33. Specifically, the speech distribution calculation unit 22 uses the value of the user relative frequency 325 and a value of the distribution conversion coefficient 326 of the speech distribution information 33 to calculate a value of the interface ideal relative frequency 327. The distribution conversion coefficient of the speech distribution information 33 may be acquired together with the user relative frequency at the time of proceeding to Step 121, may be acquired in a step before Step 121, such as Step 120, or may be acquired in a step added before Step 121. The interface ideal relative frequency is not necessarily calculated before Step 122 as long as the calculation is performed before Step 127 in which the interface ideal relative frequency is used.

Step 122: The speech distribution calculation unit 22 acquires the speech history information 32B. If the speech history information 32B already exists, this step may be performed before Step 110 in which the speech feature calculation unit 21 acquires the speech history information 32B.

Step 123: The speech distribution calculation unit 22 determines whether the speech history information 32B includes the j-th speech feature value. The speech distribution calculation unit 22 proceeds to Step 124 if there is the j-th speech feature (123: YES), and the speech distribution calculation unit 22 proceeds to Step 126 if there is no j-th speech feature value (123: YES).

Step 124: The speech distribution calculation unit 22 acquires the j-th speech feature value of the speech history information 32B, and increments a pair of the interface frequencies 328 that satisfy the value of the speech feature value lower limit 322 and the value of the speech feature value upper limit 323 of the speech distribution information 33 by one.

Step 125: The speech distribution calculation unit 22 increments a counter j by one.

Step 126: The speech distribution calculation unit 22 calculates a value of the interface relative frequency 329 using the value of the interface frequency 328 of the speech distribution information 33.

Step 127: The speech distribution calculation unit 22 uses a value of the interface ideal relative frequency 327 and the value of the interface relative frequency 329 of the speech distribution information 33 to calculate a value of the interface relative frequency distance 330. The value of the distribution conversion coefficient 326 of the speech distribution information 33 may be acquired together with the value of the user relative frequency 325 at the time of proceeding to Step 121, may be acquired in a step before Step 121, such as Step 120, or may be acquired in a step added before Step 121.

Step 128: The speech distribution calculation unit 22 calculates a value of the interface ideal feature value lower limit 331 and a value of the interface ideal feature value upper limit 332 using the value of the interface relative frequency distance 330 of the speech distribution information 33, and then, ends the processing.

As described above, the speech distribution calculation unit 22 uses the speech feature value and the speech history information 32 calculated by the speech feature calculation unit 21 to calculate the speech distribution information 33 including the user relative frequency 325 and the interface relative frequency 329. As a result, it is possible to calculate the ideal speech feature value for the speech output by the interaction interface. In addition, the previous speech distribution information 33 may also be used to update to the latest speech distribution information 33 in the case of the operation of the speech distribution calculation unit 22 performed for the second time or later since the start of the interaction.

Figure 11:
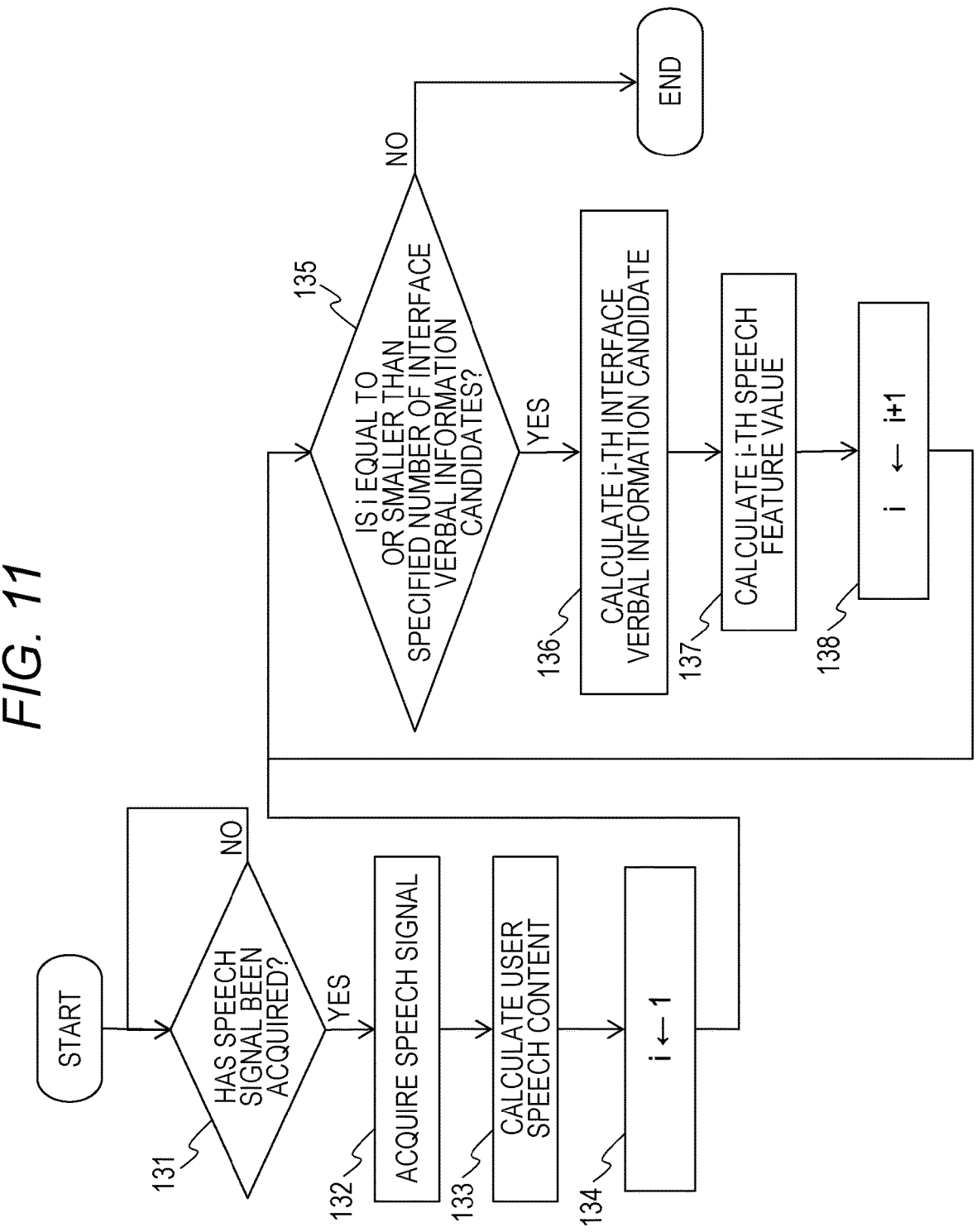
FIG. 11 is a diagram illustrating a flowchart illustrating an example of a processing procedure in a verbal information calculation unit according to the first embodiment.

FIG. 11 is a flowchart illustrating an example of a processing procedure in the verbal information calculation unit 23.

Step 131: The verbal information calculation unit 23 determines whether the speech signal input unit 11 has acquired a speech signal. The verbal information calculation unit 23 proceeds to Step 132 if the speech signal has been acquired (131: YES), and the verbal information calculation unit 23 repeats Step 131 if the speech signal has not been acquired (131: NO). Step 131 may be performed by the speech feature calculation unit 21, or Step 131 may be repeated until a plurality of signal acquisition units selected in advance by an expert or all the signal acquisition units acquire signals. Further, whether the speech feature calculation unit 21 has acquired the speech signal may be determined instead of determining whether the speech signal input unit 11 has acquired the speech signal Step 132: The verbal information calculation unit 23 acquires the speech signal. The speech signal may be directly acquired from the speech signal input unit 11 or may be acquired from the speech feature information 31 stored by the speech feature calculation unit 21.

Step 133: The verbal information calculation unit 23 calculates a user speech content. Various methods for calculating the speech content from the speech signal are known, and details thereof will be omitted here. When the speech signal includes a plurality of speeches, the speech signal may be divided for each speech to calculate a user speech content for each speech, or a user speech content may be collectively calculated. A threshold may be set in advance according to the determination of an expert, and the verbal information calculation unit 23 may collectively calculate a user speech content if a time between speeches falls within the threshold or divide the speech signal to calculate user speech contents if the time between speeches exceeds the threshold.

Step 134: The verbal information calculation unit 23 sets the counter i to one.

Step 135: The verbal information calculation unit 23 determines whether the counter i is equal to smaller than a specified number of interface verbal information candidates. The verbal information calculation unit 23 proceeds to Step 136 if the counter i is equal to or smaller than the specified number, and the verbal information calculation unit 23 ends the processing if the counter i exceeds the specified number. The specified number may be a number input in advance according to the determination of an expert, or may be a number obtained by calculating the previous interface verbal information candidates. Further, the speech setting information 35 may include an item for inputting the specified number, and a numerical value input to that item may be used based on the determination of an expert, the operation in the previous interaction, or the like.

Step 136: The verbal information calculation unit 23 calculates the i-th interface verbal information candidate according to the speech content of the user. Various methods for calculating the interface verbal information candidate from the speech content of the user are known, and details thereof will be omitted here.

Step 137: The verbal information calculation unit 23 calculates a speech feature value of the i-th interface verbal information candidate.

Step 138: The verbal information calculation unit 23 increments the counter i by one.

In this manner, the verbal information calculation unit 23 calculates the speech content of the user using the speech signal acquired by the speech signal input unit 11, and calculates candidates of a speech content of the interaction interface and speech feature values thereof in accordance with the speech content of the user. As a result, it is possible to calculate the speech feature value used to select a speech candidate output by the interaction interface and a speech to be actually output.

Note that the speech feature calculation unit 21 and the verbal information calculation unit 23 may operate in any order. The speech feature calculation unit 21 may operate first, and the verbal information calculation unit 23 may operate after calculation of the speech feature value, or the order may be reversed. Further, a functional unit that operates first may be set to be used to trigger the operation of another functional unit that operates later by setting, for example, the verbal information calculation unit 23 to operate together when the speech feature calculation unit 21 acquires the speech signal. Before the operation of the functional unit that operates first ends, the other functional unit may start operating. As for other functional units as well, any operation order may be set as long as necessary information is acquired or calculated.

Figure 12:
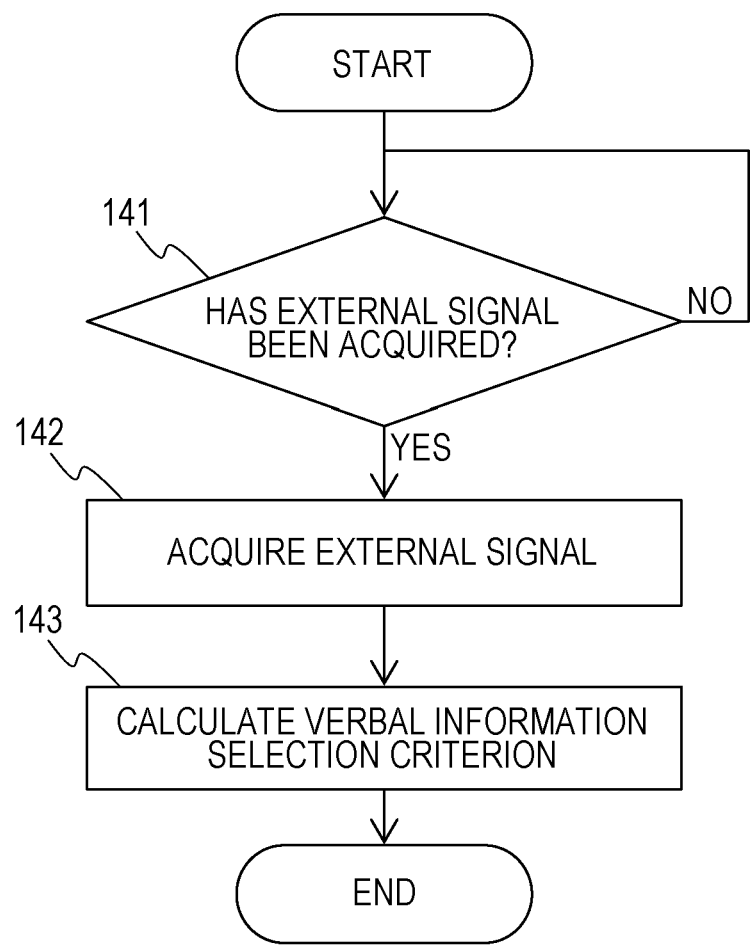
FIG. 12 is a diagram illustrating a flowchart illustrating an example of a processing procedure in a speech setting calculation unit according to the first embodiment.

FIG. 12 is a flowchart illustrating an example of a processing procedure in the speech setting calculation unit 24.

Step 141: The speech setting calculation unit 24 determines whether the external signal input unit 12 has acquired an external signal. The speech setting calculation unit 24 proceeds to Step 142 if the external signal has been acquired (141: YES), and the speech setting calculation unit 24 repeats Step 141 if the external signal has not been acquired (141: NO). The Step 141 may be performed by the speech setting calculation unit 24 for another input unit. Step 141 may be repeated until a plurality of signal acquisition units selected in advance by an expert or all the signal acquisition units acquire signals.

Step 142: The speech setting calculation unit 24 acquires the external signal. When there are a plurality of types of external signals, a step of determining whether all the external signals have been acquired may be added after Step 142. The speech setting calculation unit 24 may proceed to Step 143 if all the external signals have been acquired, and the speech setting calculation unit 24 may return to Step 141 if any external signal has not been acquired.

Step 143: The speech setting calculation unit 24 stores information calculated from the external signal in the verbal information selection criterion 351 of the speech setting information 35, and ends the processing.

In this manner, the speech setting calculation unit 24 uses the external signal acquired by the external signal input unit 12 to calculate the speech setting information 35 including the verbal information selection criterion from the external signal. As a result, it is possible to select the interface speech content using the interface ideal feature value lower limit 331 and the interface ideal feature value upper limit 332 of the speech distribution information 33, and the interface verbal information candidate 342 of the verbal information 34 and the speech feature value 343 thereof.

When the speech setting information 35 includes items other than the verbal information selection criterion, a step of acquiring information of each item may be added in accordance with types and the number of items. In the case of the operation of the speech setting calculation unit 24 performed for the second time or later since the start of the interaction, the previous speech setting information 35 may also be used, for example, by updating the speech setting information 35 to the latest information only when there is a change from the previous information. For example, when the speech setting information 35 in the previous interaction is used, the speech setting calculation unit 24 may operate by using information other than the external signal as a trigger, or the verbal information selection criterion may be calculated using information other than the external signal.

Figure 13:
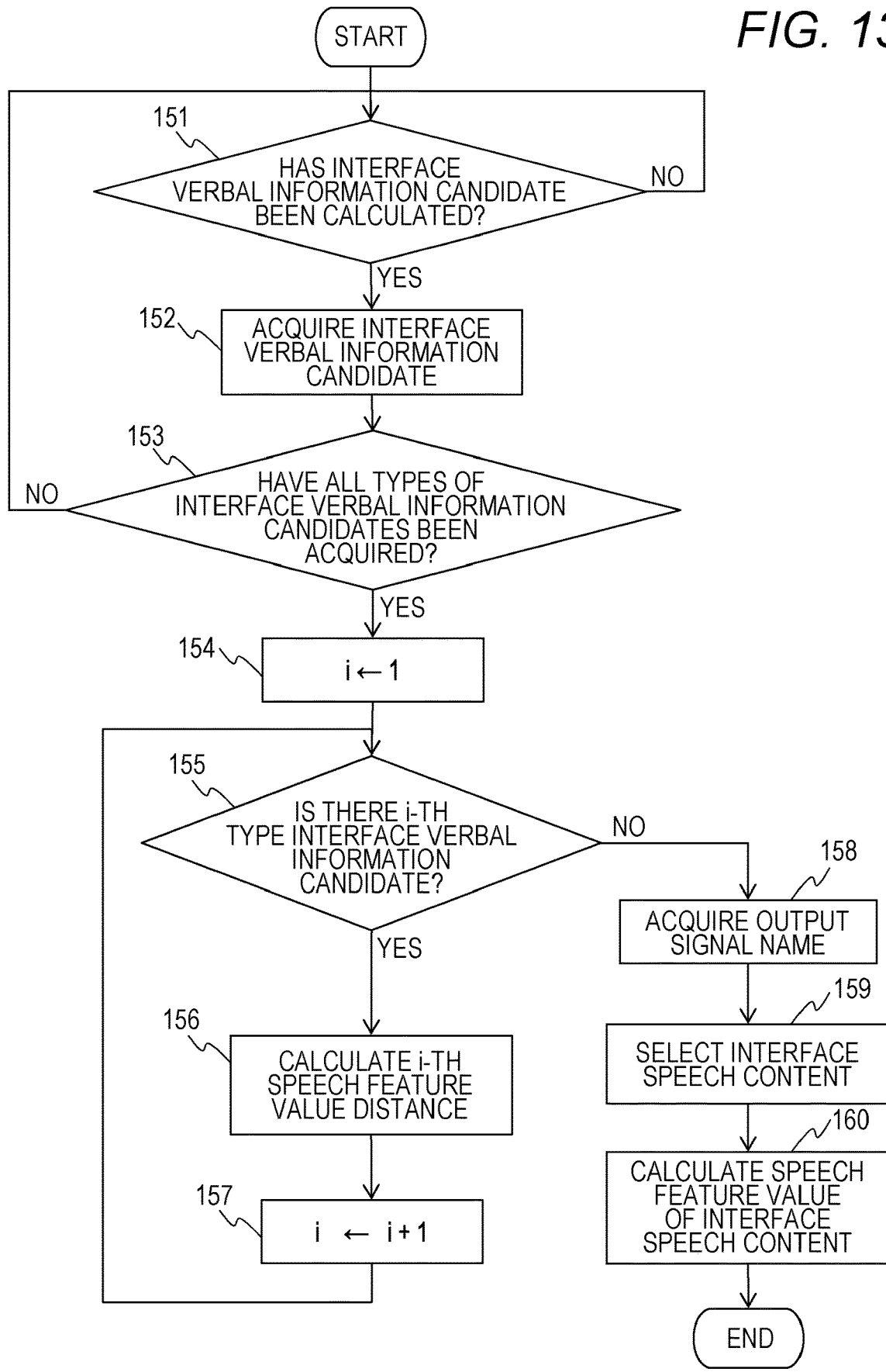
FIG. 13 is a diagram illustrating a flowchart illustrating an example of a processing procedure in a speech information calculation unit according to the first embodiment.

FIG. 13 is a flowchart illustrating an example of a processing procedure in the speech information calculation unit 25.

Step 151: The speech information calculation unit 25 determines whether the verbal information calculation unit 23 has calculated the interface verbal information candidate 342. The speech information calculation unit 25 proceeds to Step 152 if the interface verbal information candidate 342 has been calculated (151: YES), and the speech information calculation unit 25 repeats Step 151 if the interface verbal information candidate 342 has not been calculated (151: NO). Step 151 may be performed by the speech information calculation unit 25 for another functional unit, and whether the verbal information calculation unit 23 has calculated or acquired another information may be determined.

Step 151 may be repeated until a plurality of pieces of information selected in advance by an expert or all the pieces of information are acquired. For example, Step 151 may be repeated until all of the interface ideal feature value lower limit 331 and the interface ideal feature value upper limit 332 of the speech distribution information 33 used to calculate the interface speech content, the interface verbal information candidate 342 of the verbal information 34, and the verbal information selection criterion 351 of the speech setting information 35 are calculated.

Step 152: The speech information calculation unit 25 acquires the interface verbal information candidate 342 of the verbal information 34 and the speech feature value 343 thereof, and stores them in the interface verbal information candidate 361 and the speech feature value 365 of the output speech information 36. Upon acquisition of the interface verbal information candidate 342, the speech information calculation unit 25 also acquires the interface ideal feature value lower limit 331 and the interface ideal feature value upper limit 332 of the speech distribution information 33 and the verbal information selection criterion 351 of the speech setting information 35. The acquisition of the interface ideal feature value lower limit 331, the interface ideal feature value upper limit 332, and the verbal information selection criterion 351 may be performed in another step before calculating the interface speech content, or a step for acquiring the respective pieces of information may be added.

Step 153: The speech information calculation unit 25 determines whether all types of interface verbal information candidates have been acquired. The speech information calculation unit 25 proceeds to Step 154 if all types of interface verbal information candidates have been acquired (153: YES), and the speech information calculation unit 25 returns to Step 151 if any type of interface verbal information candidate has not been acquired (153: NO).

Step 154: The speech information calculation unit 25 sets the counter i to one.

Step 155: The speech information calculation unit 25 determines whether there is the i-th type interface verbal information candidate. The speech information calculation unit 25 proceeds to Step 156 if there is the i-th type interface verbal information candidate (155: YES), and the speech information calculation unit 25 proceeds to Step 158 if there is no i-th type interface verbal information candidate (155: NO).

Step 156: The speech information calculation unit 25 calculates a speech feature value distance of the i-th type interface verbal information candidate and stores the calculated speech feature value distance in the speech feature value distance 362 of the output speech information 36.

Step 157: The speech information calculation unit 25 increments the counter i by one.

Step 158: The speech information calculation unit 25 acquires an output signal name. The output signal name is set in advance, for example, as described above.

Step 159: The speech information calculation unit 25 uses the interface ideal feature value lower limit 331 and the interface ideal feature value upper limit 332 of the speech distribution information 33, the interface verbal information candidate 342 of the verbal information 34, the verbal information selection criterion 351 of the speech setting information 35, and the speech feature value distance 362 to select an interface speech content from among the interface verbal information candidates 342, and stores the selected interface speech content in the interface speech content 364 of the output speech information 36. Since the interface speech content to be output is selected from among the interface verbal information candidates, the appropriate speech content corresponding to the user speech content is output. Since the interface speech content is selected based on the speech feature value distance, the speech feature value frequency distribution of the interaction system can be approximated to the ideal frequency distribution.

Step 160: The speech information calculation unit 25 calculates or acquires a speech feature value of the selected interface speech content, stores the speech feature value in the speech feature value 365 of the output speech information 36, and ends the processing.

In this manner, the speech information calculation unit 25 calculates the output speech information 36 including the interface speech content using the interface ideal feature value lower limit and the interface ideal feature value upper limit calculated by the speech distribution calculation unit 22, the interface verbal information candidate calculated by the verbal information calculation unit 23 and the speech feature value thereof, and the verbal information selection criterion calculated by the speech setting calculation unit 24. As a result, it is possible to output the speech of the interaction interface that can effectively achieve both the sympathetic evocation and the action induction.

Note that the speech information calculation unit 25 may update the previous output speech information 36 to the latest information in the case of the operation of the speech information calculation unit 25 performed for the second time or later since the start of the interaction.

Figure 14:
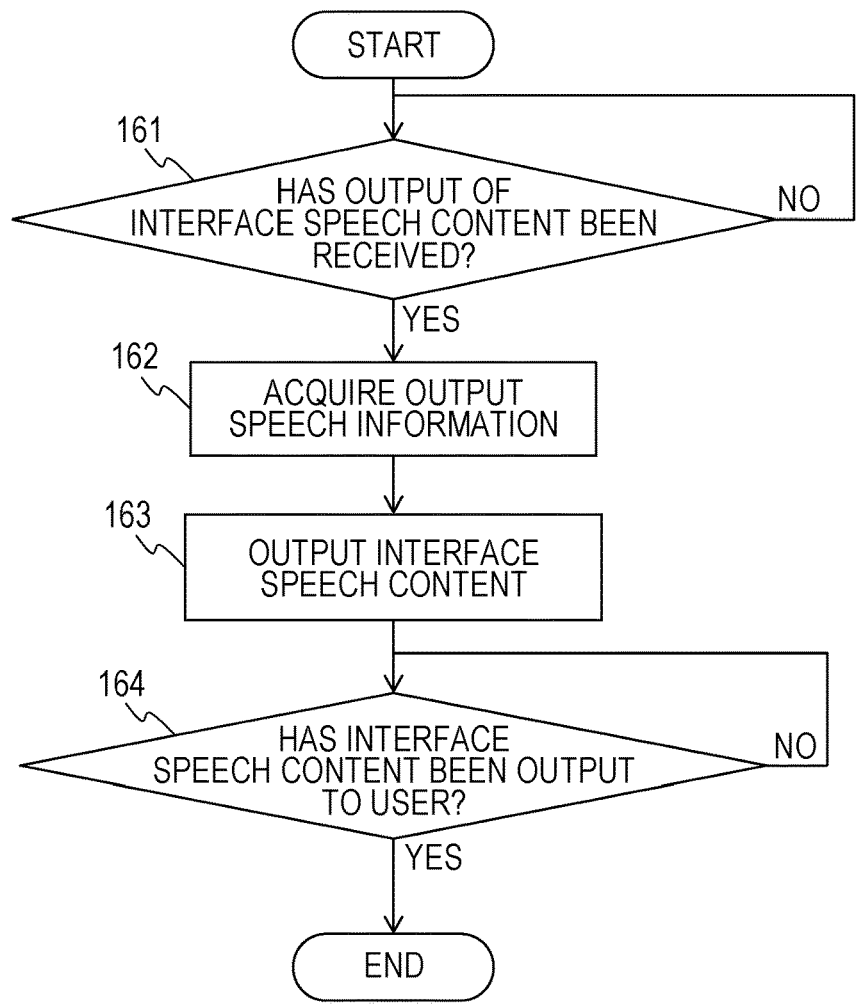
FIG. 14 is a diagram illustrating a flowchart illustrating an example of a processing procedure in an interaction information output unit according to the first embodiment.

FIG. 14 is a flowchart illustrating an example of a processing procedure in the speech information output unit 26.

Step 161: The speech information output unit 26 determines whether the speech information calculation unit 25 has calculated the interface speech content 364 of the output speech information 36. The speech information output unit 26 proceeds to Step 162 if the interface speech content 364 has been calculated (161: YES), and the speech information output unit 26 repeats Step 161 if the interface speech content 364 has not been calculated (161: NO).

Step 161 may be performed by another functional unit such as the speech information calculation unit 25. The speech information output unit 26 may determine whether other information of the output speech information 36 has been acquired, and proceed to Step 162. The speech information output unit 26 may follow a determination criterion that combines a plurality of pieces of information, such as whether the interface speech content 364 and its speech feature value 365 have been calculated, and may proceed to Step 162 if specific information selected in advance by an expert has been acquired.

Step 162: The speech information output unit 26 acquires the output speech information 36.

Step 163: The speech information output unit 26 outputs the interface speech content to the output unit 15. The speech information output unit 26 may output some or all of pieces of other information, for example, by outputting a speech feature value of the interface speech content to the output unit 15, together with the interface speech content. When the speech feature value of the interface speech content greatly changes from a speech feature value at the time of the previous output, the speech information output unit 26 may perform output so as to change the speech feature value of the interaction interface over a predetermined number of times or over time if the interface speech content is not affected by the speech feature value.

Step 164: The speech information output unit 26 determines whether the output unit 15 has output the interface speech content. The speech information output unit 26 ends the processing if the interface speech content has been output (164: YES), and the speech information output unit 26 returns to Step 163 if the interface speech content has not been output (164: NO). Further, the speech information output unit 26 may be set to return to Step 162 or Step 163 if the interface speech content has not been output.

In this manner, the speech information output unit 26 can present the acquired information, such as the interface speech content calculated in the speech information calculation unit 25, to the user via the interaction interface. As a result, the user's sympathy can be effectively evoked, a continuous interaction or an interaction of other information can be realized, and a specific action of the user can be effectively induced.

Note that the present embodiment is an example described in detail for the sake of easy understanding, and features of the present specification are not limited to the present embodiment. For example, the interaction system may be an integrated type of the information processing device 1, the speech input device 2, the output device 3, and the external input device 4, such as a smartphone and a tablet PC. Further, an interaction program using a device provided in a smartphone or a tablet PC may execute the processing of the present embodiment.

Figure 15:
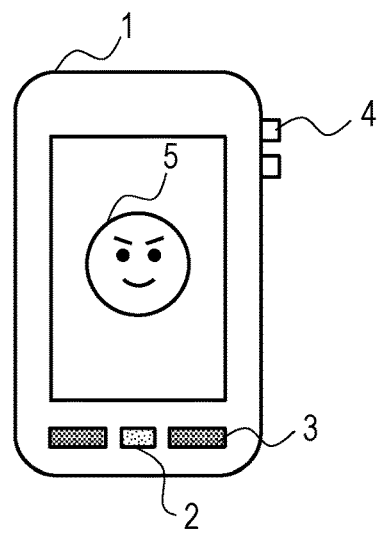
FIG. 15 is a diagram illustrating another configuration example of the interaction system according to the first embodiment.

FIG. 15 is a diagram illustrating an example of an interaction system (device) that includes the information processing device 1, the speech input device 2, the output device 3, the external input device 4, and the output device 5, and executes an interaction program. The output device 5 is, for example, a display and can present information calculated by the information processing device 1 regarding a facial expression of an interaction interface and a speech of a user.

Using such a device, the interaction program measures speech data during the interaction by speech measurement, calculates a speech feature value, calculates a speech feature value distribution of the user based on the speech feature value, and calculates an ideal speech feature value distribution of the interaction interface. The interaction program calculates the latest ideal speech feature value, and further, calculates a speech content of the user to calculate an interface verbal information candidate matching the speech content of the user and its speech feature value. The interaction program acquires an interface verbal information selection criterion, and selects and outputs a speech of the interaction interface using the ideal speech feature value distribution of the interaction interface, the interface verbal information candidate, and its speech feature value.

Further, for example, an expert may perform determination in advance regarding the configurations and/or operations of the respective functional units in the arithmetic unit 20 of the information processing device 1, and the respective functional units may input and/or output information according to the determination of the expert if there is information that can be input. Regarding a relational expression to calculate the interface ideal relative frequency, another relational expression may be set to perform calculation without using the user relative frequency itself, for example, by setting a relational expression or an algorithm in advance according to the determination of the expert.

Further, the respective functional units of the arithmetic unit 20 may operate based on another method such as reading preset information or previously used information, and the information may be acquired and output in combination with a preset expert's determination. If pieces of information created by the respective functional units include the same items, it is unnecessary to create these items one by one, and as a result, there may be information or items that are not created.

In addition, when there are a plurality of measurement channels or measurement devices for the same type of speech signal, the interaction system may acquire an index, such as an average waveform between the plurality of channels, and use the index as a speech signal. Further, the interaction system may assign other names to pieces of information, for example, by using "signal A" and "signal B", instead of "signal 1" and "signal 2".

Further, an operation of the interaction interface may be output using information other than the voice, for example, by acquiring characters (text data) as a speech signal and calculating a speech feature value from the characters, to evoke the sympathy or induce an action of the user. For example, the number of characters input by the user may be used as the speech feature value, and characters to be output by the interaction interface may be calculated based on a speech feature value distribution of the user.

Further, some pieces of the information included in the storage unit 30 may be set by learning in advance. For example, a database is used in which a user relative frequency, an interface relative frequency, duration of an interaction between a user and an interaction interface, the amount of the interaction, and a change or presence or absence of an action of the user before and after a speech of the interaction interface are stored in association with each other.

For example, an appropriate distribution conversion coefficient may be set by adding a new functional unit such as an interaction distribution learning unit to the arithmetic unit 20 or adding a function to another functional unit. In this case, the database includes at least the user relative frequency 325 and the interface relative frequency 329 of the speech distribution information 33. Since the appropriate distribution conversion coefficient is set by the prior learning using the database, it is possible to effectively achieve both the sympathetic evocation and the action induction.

The appropriate distribution conversion coefficient obtained by the prior learning using the database can be set by the following method, for example. This method includes: acquiring a user relative frequency and an interface relative frequency; and calculating the duration of an interaction between the user and the interaction interface showing the user relative frequency and the interface relative frequency, the amount of the interaction, and a change or presence or absence of an action of the user before and after a speech of the interaction interface. Furthermore, the relationships between the distribution conversion coefficient and each of the duration of the interaction, the amount of the interaction, and the change or presence or absence of the action of the user is calculated.

Using these relationships, the distribution conversion coefficient may be set according to the determination of an expert, or may be set using a machine learning algorithm, such as logistic regression analysis and Support Vector Machine, so as to increase the duration of the interaction, the amount of the interaction, and the change or presence or absence of the action of the user with respect to data used in the prior learning.

Further, for example, learning using a survey result for a subjective questionnaire to a user may be performed to set information other than the distribution conversion coefficient by prior learning, for example, to set the interface ideal relative frequency of the speech distribution information 33. In the case of setting the information other than the distribution conversion coefficient, information included in a database can be set according to the purpose, and the database includes at least the interface relative frequency 329 of the speech distribution information 33 in this case. When an interface ideal relative frequency is set by the prior learning, the interface ideal relative frequency may be set regardless of the user relative frequency and the distribution conversion coefficient. In this case, a criterion for the interface ideal relative frequency is prepared in advance and does not change during an interaction.

Further, the prior learning may be performed in advance by using only data regarding a specific user. An item called user is created in the storage unit 30 or a database, and information on the user and an attribute of the user are input to use, for example, only information acquired from the user or a user having a common attribute.

Further, whether data for the prior learning is sufficiently accumulated may be determined by an expert, or determined by the interaction system based on information input by the expert in advance. If the data is not sufficiently accumulated, the interaction system may acquire data by instructing the user to create data for learning or acquiring data for learning using another user or past speech history data. For example, in a case of inducing an action for which the number of times of interactions in a series of interactions is expected to be small, such as turning on or off a light and adjusting the temperature of an air conditioner, not only the user's own data but also data of another user or user's past data may be used.

Further, one interaction interface may interact with a plurality of users, instead of the one-to-one interaction between the user and the interaction interface, and a speech of the interaction interface may be output so as to simultaneously achieve both sympathetic evocation and action induction of the plurality of users. In this case, a user relative frequency and an ideal interface relative frequency may be calculated for each of the users to calculate an interface speech content and its speech feature value. Alternatively, the user relative frequencies of the plurality of users may be added, and an ideal interface relative frequency may be calculated using an added distribution thereof to calculate an interface speech content and its speech feature value.

The information processing device 1 of the present embodiment calculates one type of speech feature value distribution using one type of speech feature value, calculates one type of ideal speech feature value distribution of the interaction interface, and calculates three sets of verbal information candidates of the interaction interface and the speech feature values thereof. Furthermore, the verbal information is selected based on the ideal speech feature value distribution of the interaction interface, the three sets of verbal information candidates, and the speech feature values thereof, and the speech of the interaction interface is output based on the selected verbal information.

In other examples, two or more types of speech feature values may be used, two or more types of speech feature value distributions may be calculated, two sets of verbal information candidates and speech feature values thereof may be used, or four or more sets of verbal information candidates and speech feature values thereof may be used. A speech of the interaction interface can be output based on such speech feature value distributions and verbal information candidates.

When a plurality of types of speech feature values are used, it is possible to more effectively determine the speech content that achieves both the sympathetic evocation and the action induction of the user. Even when there are two or more types of speech feature value, the method for calculating speech feature values and calculating speech feature value distributions is the same. Similarly, even when the number of verbal information candidates is two or four or more, the method of calculating verbal information candidates and speech feature values thereof is the same. When two or more types of ideal speech feature value distributions are calculated to select verbal information of the interaction interface, the verbal information is selected after setting a method for selecting the verbal information from a plurality of speech feature value distributions by setting the priority of the ideal speech feature value distributions in advance or by standardizing each speech feature value distribution and selecting the verbal information so as to minimize the sum of distribution errors.

In addition, the information processing device 1 in the case of calculating one type of speech feature value from one type of speech signal and calculating one type of speech feature value distribution has been described in the present embodiment, but one type of speech feature value or speech feature value distribution is not necessarily calculated from one type of speech signal. For example, two types of speech feature values may be calculated from one type of speech signal, or one type of speech feature value may be calculated from two types of speech signals.

Even when one type of speech feature value and one type of speech feature value distribution are not calculated from one type of speech signal, the method for calculating the speech feature value from the speech signal is the same. This is the same even in the case of calculating the verbal information and its speech feature value from the speech signal, and the number of types of speech feature value distribution and the number of types of speech feature value to calculate the speech feature value distribution do not matter as long as the speech feature value distribution is calculated.

Second Embodiment

This embodiment uses a specific graphical user interface (GUI) at the time of setting information regarding an interaction between a user and an interaction interface in the system configuration according to the first embodiment. Hereinafter, only operations other than the operations similar to those of the first embodiment will be described.

Figure 16:
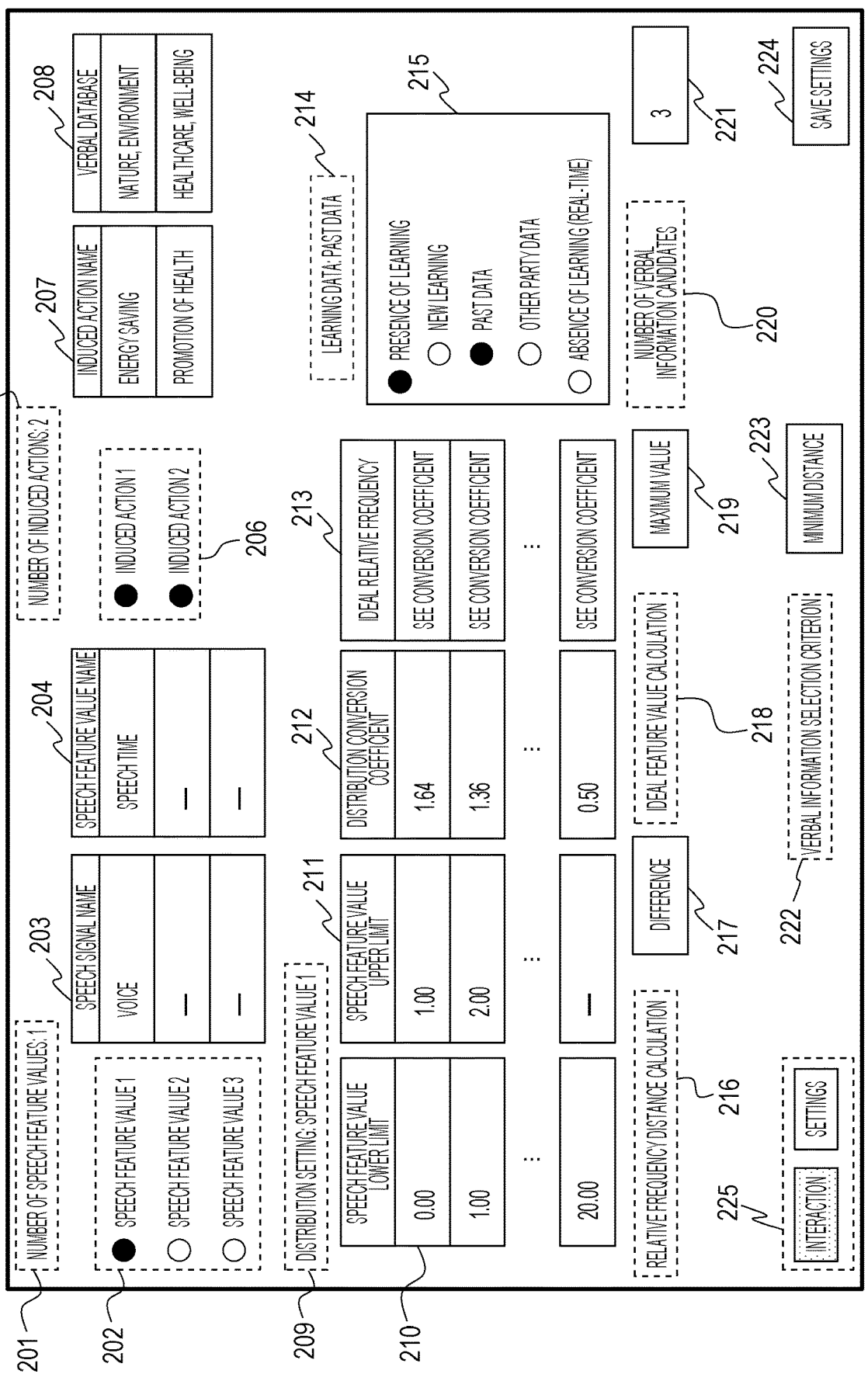
FIG. 16 is a diagram illustrating an example of an output screen during setting of a speech feature value and the like according to a second embodiment.

FIG. 16 is a diagram illustrating an example of an output screen during setting of a speech feature value and the like. An upper left part 201 of FIG. 16 displays the number of speech feature values to be calculated. A lower part 202 displays buttons and numbers for selection of each speech feature value to be calculated. A right part 203 displays each speech signal name to be acquired. A right part 204 displays each speech feature value name to be calculated.

A right part 205 displays the number of types of actions to be induced (induced actions). A lower part 206 displays buttons and numbers for selection of each action (type of action) to be induced. A right part 207 displays each action name to be induced. A right part 208 displays a name of language database used for action induction. A lower left part 209 displays a number of a speech feature value for setting the distribution.

A lower part 210 displays a speech feature value lower limit used to calculate each user frequency. A right part 211 displays a speech feature value upper limit used to calculate each user frequency. A right part 212 displays a distribution conversion coefficient used when calculating an interface ideal relative frequency from each user frequency. A right part 213 displays a method for setting the interface ideal relative frequency. A numerical value may be directly input to the interface ideal relative frequency without using the distribution conversion coefficient.

A right part 214 displays a result of selecting the method for calculating the distribution conversion coefficient and the interface ideal relative frequency. Specifically, displayed is a result obtained by selecting whether to use learning data, whether to perform calculation without using the learning data, and whether to newly acquire information, to use past data, or to use other party data is displayed in the case of using the learning data. A lower part 215 displays buttons for selection of the upper part 214.

A lower left part 216 displays a heading for setting a method for calculating a relative frequency distance. A right part 217 displays the method for calculating the relative frequency distance. A right part 218 displays a heading to set the method for calculating an interface ideal feature value lower limit and an interface ideal feature value upper limit. A right part 219 displays the method for calculating the interface ideal feature value lower limit and the interface ideal feature value upper limit.

A right part 220 displays a heading to set the number of interface verbal information candidates. A right part 221 displays the setting of the number of interface verbal information candidates. A lower left part 222 displays a heading to set a verbal information selection criterion. A right part 223 displays the setting of the verbal information selection criterion. A right part 224 displays a button to save the number of speech feature values set on the setting screen of FIG. 16. A lower left side 225 of FIG. 16 displays a button to select whether to display an interaction screen or the setting screen.

In this manner, the information used for calculation of the interface speech content, such as setting of each speech feature value and its distribution, can be easily set using the GUI, and the settings can be changed, added, or deleted. In addition, the interaction in accordance with the user setting is realized. Note that the speech setting calculation unit 24 may operate so as to store some or all of these settings in the speech setting information 35, and a functional unit and information to store information other than the verbal information selection criterion may be newly installed.

Note that the information displayed on the screen described in the present embodiment is an example, and the invention is not necessarily limited to one having all the configurations described above, and addition, deletion, or replacement of other configurations may be made. For example, information that can be set by an expert may be added to configurations not described in the present embodiment.

Incidentally, the invention is not limited to the above-described embodiments, and includes various modifications. For example, the above-described embodiments have been described in detail in order to describe the invention in an easily understandable manner, and are not necessarily limited to one including the entire configuration that has been described above. Further, a part of the configuration of a certain embodiment can be replaced with the configuration of another embodiment, and the configuration of another embodiment can be added to the configuration of a certain embodiment. Further, addition, deletion or substitution of other configurations can be made with respect to some configurations of each embodiment.

In addition, a part or all of the above-described configurations, functions, processing units, processing means, and the like may be realized by hardware, for example, designed with an integrated circuit and the like. Further, the above-described respective configurations, functions and the like may be realized by software by the processor interpreting and executing a program for realizing the respective functions. Information such as programs, tables, and files that realize the respective functions can be stored in a recording device such as a memory, a hard disk, and a solid state drive (SSD), or a recording medium such as an IC card, an SD card, and a DVD.

What is claimed is:

1. An interaction system, which performs an interaction with a user, comprising:
    a microphone;
    a speaker;
    a processor coupled to the microphone and the speaker; and
    a memory coupled to the processor, the memory storing instructions that configured the processor to:
    enable the microphone to receive a speech signal of the user,
    determine a speech content of the interaction system based on a speech content acquired from the speech signal of the user such that a frequency distribution of speech feature values of the speech content of the interaction system approaches an ideal frequency distribution,
    determine a distribution conversion coefficient from the frequency distribution of the speech feature values of the user based on executing a machine learning algorithm to increase the duration of the interaction, the amount of the interaction, and the change or presence or absence of the action of the user with respect to data used in a prior learning,
    calculate the ideal frequency distribution based on the determined distribution conversion coefficient,
    calculate a distance between the frequency distribution of the speech feature values of the speech content of the interaction system and the ideal frequency distribution, and calculate an ideal speech feature value of the speech content of the interaction system based on the distance, and
    cause the speaker to output the determined speech content of the interaction system.

2. The interaction system according to claim 1,
    wherein the processor is configured to determine the ideal frequency distribution based on the frequency distribution of the speech feature values of the user.

3. The interaction system according to claim 1,
    wherein a type of the speech feature value is any one of a speech time, a speech pitch, a speech tone, a speech energy, and a speaker switching pause.

4. The interaction system according to claim 2,
    wherein the processor is configured to calculate a frequency distribution of speech times of the user and determine the speech content of the interaction system such that a number of speech times shorter than a speech time of the user increases.

5. The interaction system according to claim 1,
    wherein the processor is configured to select a respective speech content to be output by the interaction system from among a plurality of candidates based on the ideal speech feature value.

6. The interaction system according to claim 1,
    wherein the processor is configured to determine the speech content of the interaction system based on speech setting information received from an outside.

7. The interaction system according to claim 6,
    wherein the speech setting information is at least any one of types and a number of the speech feature values, a lower limit and an upper limit of the speech feature value, the distribution conversion coefficient, a method for calculating the distance, a number of the plurality of candidates, a criterion for selection from among the plurality of candidates, types and a number of induced actions, and presence or absence of use of learning data.

8. The interaction system according to claim 5,
wherein the processor is configured to select a speech content from among the plurality of candidates based on a distance between each speech feature value of the plurality of candidates and the ideal speech feature value.

9. The interaction system according to claim 1,
wherein the processor is configured to determine the speech content of the interaction system with respect to the speech content acquired from the speech signal of the user so as to approach an ideal frequency distribution to which each frequency distribution of a plurality of types of speech feature values of the speech content of the interaction system corresponds.

10. A non-transitory computer readable storage medium storing instructions executed by a computer that interacts with a user, the instructions cause the computer to perform steps comprising:
   acquiring a speech signal of the user from a microphone;
   determining a speech content of the interaction system for a speech content acquired based on the speech signal of the user such that a frequency distribution of speech feature values of the speech content of the interaction system approaches an ideal frequency distribution;
   determining a distribution conversion coefficient from the frequency distribution of the speech feature values of the user based on executing a machine learning algorithm to increase the duration of the interaction, the amount of the interaction, and the change or presence or absence of the action of the user with respect to data used in a prior learning;
   calculating the ideal frequency distribution based on the determined distribution conversion coefficient;
   calculating a distance between the frequency distribution of the speech feature values of the speech content of the interaction system and the ideal frequency distribution, and calculate an ideal speech feature value of the speech content of the interaction system based on the distance; and
   causing a speaker to output the determined speech content of the interaction system to an output device.

11. A control method of an interaction system, which includes a computer and interacts with a user, the method comprising:
   causing the computer to acquire a speech signal of the user;
   causing the computer to determine a speech content of the interaction system based on for a speech content acquired from the speech signal of the user such that a frequency distribution of speech feature values of the speech content of the interaction system approaches an ideal frequency distribution;
   causing the computer to determine a distribution conversion coefficient from the frequency distribution of the speech feature values of the user based on executing a machine learning algorithm to increase the duration of the interaction, the amount of the interaction, and the change or presence or absence of the action of the user with respect to data used in a prior learning;
   causing the computer to calculate the ideal frequency distribution based on the determined distribution conversion coefficient;
   causing the computer to calculate a distance between the frequency distribution of the speech feature values of the speech content of the interaction system and the ideal frequency distribution, and calculate an ideal speech feature value of the speech content of the interaction system based on the distance; and
   causing the computer to cause the speaker to output the determined speech content of the interaction system.

* * * * *